United States Patent
Hargrove et al.

[11] Patent Number: 5,914,775
[45] Date of Patent: Jun. 22, 1999

[54] TRIANGULATION RANGEFINDER AND SIGHT POSITIONING SYSTEM

[75] Inventors: Jeffrey B. Hargrove, Bancroft; John E. Briggs, Morrice; William G. Wickham, Perry, all of Mich.

[73] Assignee: Browning, Morgan, Utah

[21] Appl. No.: 08/862,904

[22] Filed: May 23, 1997

[51] Int. Cl.⁶ .............................. F41G 1/00; G01C 3/00
[52] U.S. Cl. ............................. 356/3.13; 33/265; 124/87
[58] Field of Search .................... 356/3.13, 140, 356/9; 33/265; 124/87

[56] References Cited

U.S. PATENT DOCUMENTS

| | | | |
|---|---|---|---|
| 2,562,187 | 7/1951 | Hamm | 33/46 |
| 2,642,661 | 6/1953 | Fredrickson | 33/46 |
| 3,120,222 | 2/1964 | Bear | 124/24 |
| 3,136,063 | 6/1964 | Stebbins | 33/46 |
| 3,410,644 | 11/1968 | McLendon | 356/247 |
| 3,455,027 | 7/1969 | Perkins | 33/46 |
| 3,505,985 | 4/1970 | Helton | 124/24 |
| 3,524,440 | 8/1970 | Hill | 124/24 |
| 3,561,418 | 2/1971 | Fredrickson | 124/24 |
| 3,618,586 | 11/1971 | Current et al. | 124/24 |
| 3,667,444 | 6/1972 | Depatie | 124/24 |
| 3,674,002 | 7/1972 | Diamond | 124/30 R |
| 3,696,517 | 10/1972 | Larson | 33/265 |
| 3,766,656 | 10/1973 | Westphal | 33/265 |
| 3,844,268 | 10/1974 | Ikeya | 124/24 R |
| 4,048,726 | 9/1977 | LeFebvre | 33/180 R |
| 4,120,096 | 10/1978 | Keller | 33/265 |
| 4,134,383 | 1/1979 | Flood | 124/24 R |
| 4,162,579 | 7/1979 | James | 33/265 |
| 4,170,071 | 10/1979 | Mann et al. | 33/265 |
| 4,177,572 | 12/1979 | Hindes | 33/265 |
| 4,178,693 | 12/1979 | Smith | 33/265 |
| 4,179,613 | 12/1979 | Koren | 250/215 |
| 4,195,414 | 4/1980 | Robinson | 33/265 |
| 4,215,484 | 8/1980 | Lauffenburger | 33/265 |
| 4,220,983 | 9/1980 | Schroeder | 362/114 |
| 4,291,469 | 9/1981 | Weast | 33/265 |
| 4,417,403 | 11/1983 | Strange | 33/265 |
| 4,481,717 | 11/1984 | Kowalski | 33/265 |
| 4,483,598 | 11/1984 | Leightner et al. | 350/558 |
| 4,495,705 | 1/1985 | Kowalski et al. | 33/265 |
| 4,497,116 | 2/1985 | Hawkins | 33/265 |

(List continued on next page.)

OTHER PUBLICATIONS

Magazine article, Fall 1996, *Bugle*, Gadgets versus Ethics, pp. 91–97.
Advertisement, *Bowhunting World*, Dec. 1996, p. 52.

*Primary Examiner*—Mark Hellner
*Attorney, Agent, or Firm*—Foster & Foster

[57] ABSTRACT

A rangefinder includes an angle sensitive transducer and a programmed data processor to calculate the distance to a target. In one embodiment, the rangefinder also includes a point-to-point measuring device. Another embodiment provides a linear actuator to selectively move a sight indicator vertically. A yet additional embodiment includes a liquid crystal display which displays information to the user.

51 Claims, 14 Drawing Sheets

U.S. PATENT DOCUMENTS

| | | | |
|---|---|---|---|
| 4,507,874 | 4/1985 | Brown | 33/265 |
| 4,514,907 | 5/1985 | Saltzman | 33/265 |
| 4,528,973 | 7/1985 | Rasmussen | 124/87 |
| 4,535,747 | 8/1985 | Kudlacek | 124/87 |
| 4,541,179 | 9/1985 | Closson | 33/265 |
| 4,551,847 | 11/1985 | Caldwell | 377/24 |
| 4,553,338 | 11/1985 | LeBeau | 33/265 |
| 4,555,856 | 12/1985 | Brown | 33/265 |
| 4,580,349 | 4/1986 | Webb | 33/265 |
| 4,584,777 | 4/1986 | Saunders | 33/265 |
| 4,587,945 | 5/1986 | Little | 124/87 |
| 4,616,623 | 10/1986 | Williams | 124/87 |
| 4,617,741 | 10/1986 | Bordeaux et al. | 33/228 |
| 4,620,372 | 11/1986 | Goodrich | 33/265 |
| 4,625,420 | 12/1986 | Figured | 33/265 |
| 4,638,565 | 1/1987 | Podany et al. | 33/265 |
| 4,643,160 | 2/1987 | Gray et al. | 124/87 |
| 4,689,887 | 9/1987 | Colvin | 33/265 |
| 4,710,020 | 12/1987 | Maddox et al. | 356/1 |
| 4,785,541 | 11/1988 | Lowry | 33/265 |
| 4,787,739 | 11/1988 | Gregory | 356/4 |
| 4,788,961 | 12/1988 | Toth | 124/24 |
| 4,796,364 | 1/1989 | Amacker | 33/265 |
| 4,823,474 | 4/1989 | Reynolds | 33/265 |
| 4,894,921 | 1/1990 | Barlow | 33/265 |
| 4,915,088 | 4/1990 | Powers | 124/87 |
| 4,953,302 | 9/1990 | Gould | 33/265 |
| 4,961,265 | 10/1990 | Roberts | 33/265 |
| 4,967,478 | 11/1990 | Sherman | 33/265 |
| 4,974,328 | 12/1990 | Lowry | 33/265 |
| 4,977,677 | 12/1990 | Troescher, Jr. | 33/265 |
| 4,979,309 | 12/1990 | Oligschlaege | 33/265 |
| 4,984,372 | 1/1991 | Blizzard | 33/265 |
| 5,025,565 | 6/1991 | Stenerson et al. | 33/265 |
| 5,040,300 | 8/1991 | Sheffield | 33/265 |
| 5,090,805 | 2/1992 | Stawarz | 356/251 |
| 5,092,052 | 3/1992 | Godsey | 33/265 |
| 5,092,053 | 3/1992 | Roberts | 33/265 |
| 5,092,308 | 3/1992 | Sheffield | 124/25 |
| 5,122,932 | 6/1992 | Ziller | 362/32 |
| 5,152,068 | 10/1992 | Meister et al. | 33/265 |
| 5,174,269 | 12/1992 | Sappington | 124/87 |
| 5,201,122 | 4/1993 | Annunziata | 33/265 |
| 5,220,907 | 6/1993 | Lonsdale | 124/87 |
| 5,229,828 | 7/1993 | Wiklund | 356/4 |
| 5,233,357 | 8/1993 | Ingensand et al. | 342/352 |
| 5,255,440 | 10/1993 | Rogers | 33/265 |
| 5,289,814 | 3/1994 | Maisamo | 124/87 |
| 5,305,530 | 4/1994 | Robertson, Jr. et al. | 33/265 |
| 5,313,409 | 5/1994 | Wiklund et al. | 364/556 |
| 5,339,227 | 8/1994 | Jones | 362/109 |
| 5,339,792 | 8/1994 | McCain | 124/87 |
| 5,347,722 | 9/1994 | Sefsick | 33/265 |
| 5,351,671 | 10/1994 | Cervera | 124/87 |
| 5,359,780 | 11/1994 | Dallaire | 33/265 |
| 5,367,780 | 11/1994 | Savage | 33/265 |
| 5,383,278 | 1/1995 | Kay | 33/265 |
| 5,394,615 | 3/1995 | Hoppe et al. | 33/265 |
| 5,398,420 | 3/1995 | Kleinschmidt | 33/265 |
| 5,413,084 | 5/1995 | Haggard | 124/44.5 |
| 5,414,936 | 5/1995 | Sappington | 33/265 |
| 5,419,050 | 5/1995 | Moore | 33/241 |
| 5,419,303 | 5/1995 | Stewart | 124/44.5 |
| 5,425,177 | 6/1995 | Pacenti | 33/228 |
| 5,479,712 | 1/1996 | Hargrove et al. | 36/265 |
| 5,575,072 | 11/1996 | Eldridge | 33/265 |

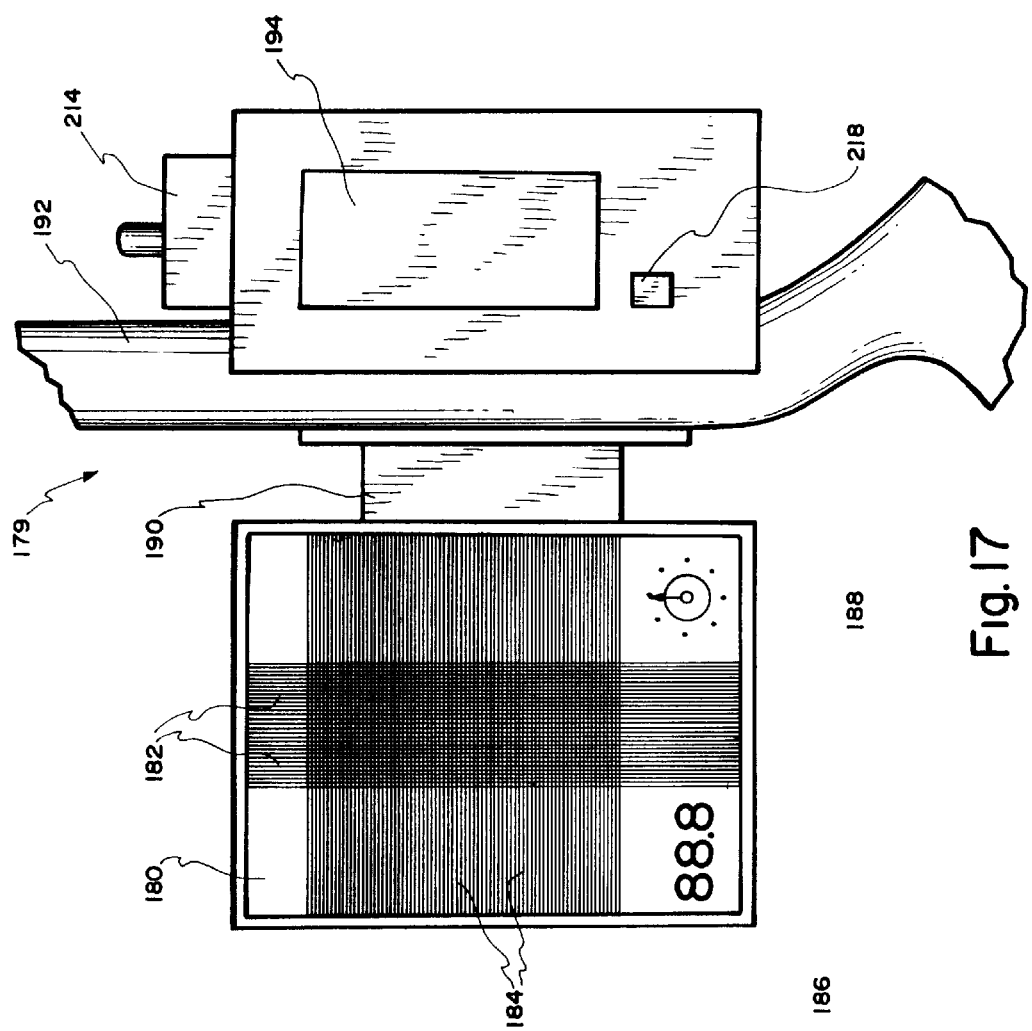
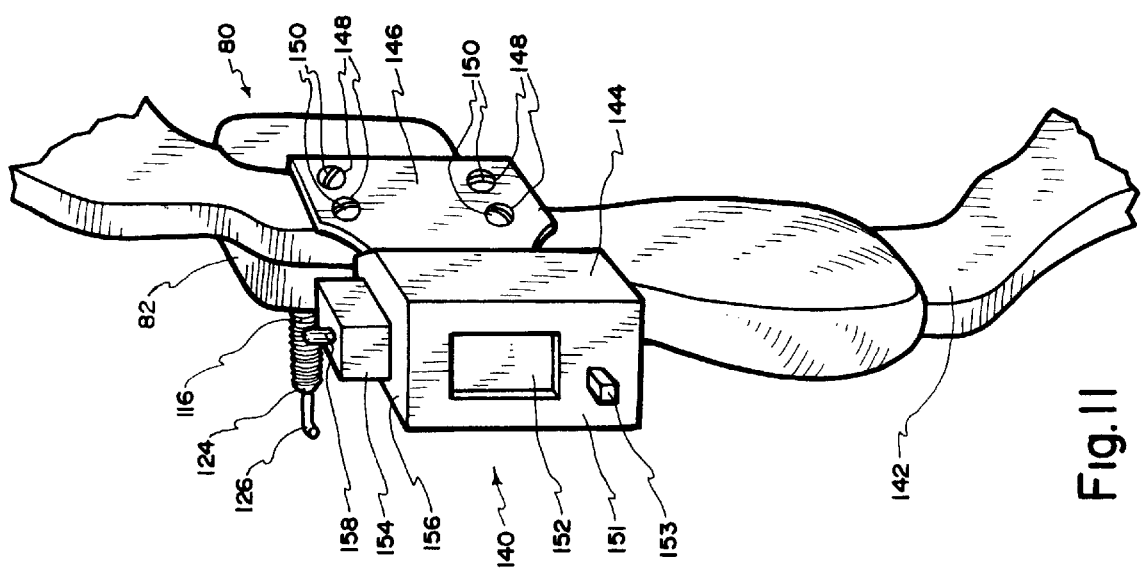

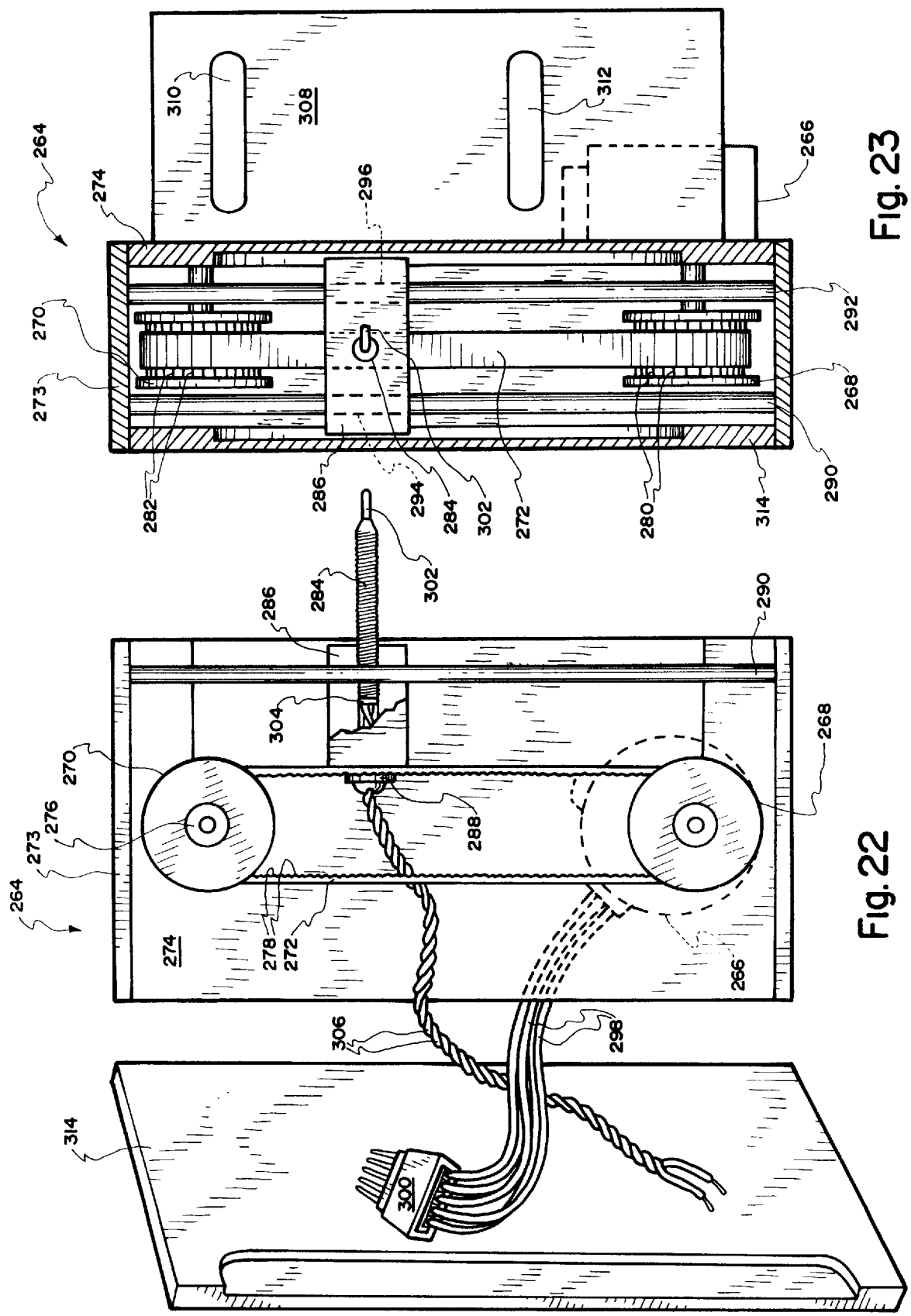

TRIANGULATION RANGEFINDER AND SIGHT POSITIONING SYSTEM

TECHNICAL FIELD

The present invention relates in general to archery and rangefinding, and more particularly, to devices and methods for determining the approximate horizontal distance from an archer to an intended target and properly positioning a sighting device.

BACKGROUND OF THE INVENTION

The archery sports of bowhunting and three-dimensional (3-D) archery requires range estimation. Unlike many forms of archery where the distance to the target is known, and where the archer and the target are in generally the same horizontal plane, bowhunting and 3-D archery involve targets placed at unknown distances and often involve steep uphill and downhill angles.

The ability of a 3-D archery or a bowhunter to determine the distance to his or her intended target, whether by range estimation or by using a rangefinder, is critical to shot accuracy. Unlike a bullet discharged from a firearm, an arrow's trajectory is very non-linear over relatively short distances. In the case of bowhunting or 3-D archery, incorrect compensation for target distance, together with the resulting arrow drop due to gravity, can lead to a missed shot, or worse, a wounded animal.

Several attempts have been made to provide rangefinding devices and methods to assist archers in estimating or determining target distance. However, for various reasons, the prior attempts to provide rangefinding devices and methods have proven largely unsuitable and inadequate for effective use in bowhunting and/or 3-D archery.

For example, one prior method of determining the distance to a target is by various bracketing techniques. One bracketing technique of rangefinding involves providing a transparent viewing window with movable brackets which allow the user to visually "frame" or bracket a target within the movable brackets. Once the target is bracketed, the distance to the target may be estimated by relating the bracket size to the target distance. A necessary assumption involved in this method is that the target size is always the same. As most bowhunters understand, however, the size of a given animal species varies considerably. Additionally limiting the usefulness of the bracketing method is the need for the user to adjust the movable brackets, either manually or electronically, during operation in attempting to bracket the target. Such manual manipulation of the adjustable brackets while preparing to shoot is highly time consuming and cumbersome. Often the shot opportunity lasts only a second or two. Finally, and perhaps most importantly, the bracketing method provides only a rough estimation as to the point-to-point distance from the user to the target rather than providing the more important horizontal distance between the user and the target. Simply put, bracketing techniques for rangefinding are imprecise, cumbersome, require too much time to carry out, and are based on assumptions that are inherently erroneous.

Another problem with respect to rangefinding relates to the uneven terrain involved in bowhunting and 3-D archery. On extreme slopes, either uphill or downhill, the distance at which the arrow must be shot to hit the target differs dramatically from the actual distance to the target. The reason is that an arrow generally will drop a given distance corresponding to the amount of time an arrow is in flight because of the constant force of gravity. Accordingly, the horizontal distance to the target is the primary factor that must be determined to accurately shoot on sloped terrain. Traditional prior art devices have not provided archers with a suitable solution for handling this problem.

Other known rangefinder devices employ the concept of triangulation, i.e., using trigonometric relationships to determine the distance to a target. For example, in U.S. Pat. No. 4,894,921, a triangulation device is described in which a weighted pendulum arm is attached to a rotary switch shaft. The pendulum rotates the switch as the bow inclination changes. The pendulum will actuate one of a plurality of switch closures, which in turn will cause one of several light emitting diodes or lamps to illuminate, indicating which sight pin should be used. While this device purports to compensate for various elevations by manually changing the pendulum's position relative to the switch shaft, this method of compensating for elevation would only be accurate if the trigonometric function relating elevation to distance were linear, which it is not.

U.S. Pat. No. 5,479,712 discloses another rangefinding device based on triangulation. This patent describes a device which utilizes a liquid crystal digital volt meter to numerically present the range without reading a scale. In this device, the distance to the target is determined by measuring an analog voltage signal which is proportional to the user's elevation and then is attenuated by a factor proportional to the tangent of the angle made between the archer's line of sight from the bow to the target and the line drawn vertically from the archer to the ground. The accuracy of this device is significantly limited by the inherent low sensitivity and low reliability of analog transducers. Specifically, since the signal in such a device must possess a specific characteristic, such as being proportional to a trigonometric ratio, transducers with high degrees of sensitivity and reliability cannot be effectively used. Accordingly, this device, at best, provides only an approximation as to the target distance.

Still another problem with respect to traditional rangefinding devices is that they do not provide any type of a movable sight which is automatically adjusted to correspond with a determined horizontal distance to a target. Rather, traditional archery bow sight pins are securely positioned at discrete increments such as for shots of 20, 25, 30, 35, and 40 yards, thus requiring the user to estimate the correct location between fixed sight pins for shots of distances other than those for which sight pins have been provided. Although single-pin, manually adjustable sights exist, such sights require the archer to physically adjust the pin to the proper location based upon the archer's perception of the proper distance to the target.

Lastly, and most significantly, a major limitation of traditional rangefinding devices is that they are not programmable. Indeed, none of the traditional rangefinding devices are capable of storing information for calibrating the device, or capable of other functions such as monitoring ambient conditions.

In view of the foregoing, there is a need to develop a rangefinding device which permits an archer to accurately determine the distance to a target. There is a further need to develop a movable sight which moves according to a determined distance to a target. Additionally, there is a need to develop a programmable rangefinding device. Still another need exists to provide a rangefinder device which may effectively utilize transducers with great sensitivity and high repeatability. A yet additional need exists to provide a rangefinder which calculates the horizontal component of the distance to a target to increase accuracy of bowhunters and/or 3-D archers when shooting on sloped surfaces.

SUMMARY AND OBJECTS OF THE INVENTION

It is an object of the invention to provide a rangefinder that is programmed to measure an elevation angle and to calculate distances to a target based on the measured elevation angle.

Another object of the invention is to provide a rangefinder that displays the calculated distance to a target on a liquid crystal display.

Another object of the invention is to provide a rangefinding device which, while in use, will require minimal manual operator input or adjustment.

Another object of the invention is to provide a rangefinder which automatically enables a display backlighting device to facilitate viewing a display when ambient light levels are low.

Another object of the invention is to provide a rangefinder which is selectively energized based on the movement of the device.

Another object of the invention is to provide a rangefinder which has the ability to sense the type of shot (uphill, downhill, or substantially level ground) by using an angle sensor.

Another object of the invention is to provide a rangefinder which determines the horizontal distance to a target based on inputs from a point-to-point measuring device and an angle sensitive transducer.

Another object of the invention is to provide a sight indicator positioning mechanism that uses input from a rangefinder to position the sight indicator.

Another object of the invention is to provide a sight indicator positioning mechanism that allows the user to change the position of the sight indicator by manual inputs.

Another object of the invention is to provide a rangefinder that uses changes in the color of light to indicate system status.

Another object of the invention is to provide a lighted sight indicator which changes the color of light in the sight indicator visible to the archer to indicate the system status of the rangefinder.

Another object of the invention is to provide a liquid crystal display with a sight displayed thereon which moves according to the horizontal distance to the target calculated by the rangefinder.

Another object of the invention is to provide a microprocessor-based rangefinder.

Another object of the invention is to provide a rangefinder which is mountable on an archery bow.

Another object of the invention is to provide a rangefinder which is hand-held.

Another object of the invention is to provide a method of calculating the horizontal distance to a target using a programmed data processor and an angle sensitive transducer.

Another object of the present invention is to provide a method of calculating the horizontal distance to a target based on input from an angle sensitive transducer and input values of either an elevation height or a point-to-point distance to a target.

Another object of the present invention is to provide a method of determining a horizontal distance to a target based on a point-to-point distance to the target together with the tilt angle of the rangefinding device.

Another object of the invention is to provide a rangefinder having multiple calibration storage locations to enable a user to move between elevated positions without having to recalibrate each time.

The foregoing objects are achieved by a rangefinder that includes an angle sensor operatively coupled with a programmed data processor which calculates the distance to a target based, at least in part, on the angle sensed by the angle sensor. One embodiment of the rangefinder apparatus provides for automatic adjustment of a movable sight indicator according to a determined distance to a target. Another embodiment of the rangefinder calculates the horizontal distance to a target based on the point-to-point distance to the target as measured, for example, by a laser point-to-point measuring device and the angle measured by an angle sensitive transducer.

Other objects, features, and advantages of the invention will become apparent from the following detailed description of the invention with reference to the accompanying drawings.

BRIEF DESCRIPTION OF THE DRAWINGS

FIG. 11 is a perspective view of another embodiment of a rangefinder which employs a point-to-point measuring device and an electro-mechanical sight indicator positioning mechanism;

FIG. 17 is a front elevation view of an alternative embodiment of the rangefinder which employs a liquid crystal display which displays a movable sight;

FIG. 22 is a front elevation view of the sight indicator positioning mechanism of FIG. 21; and FIG. 23 is a side elevation view of the sight indicator positioning mechanism of FIG. 21.

DETAILED DESCRIPTION OF THE INVENTION

Figure 1:
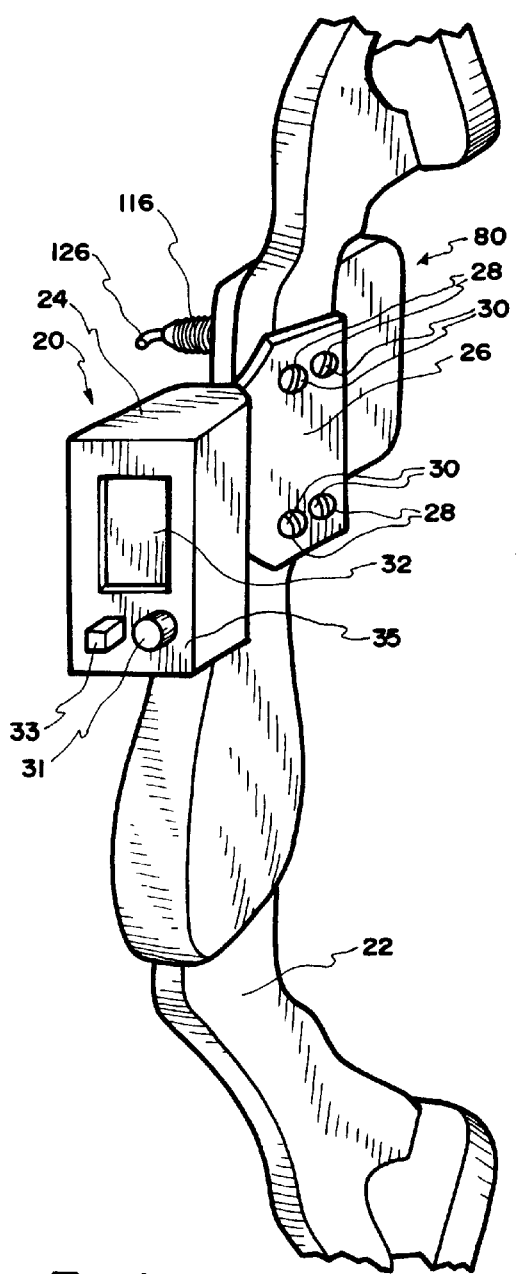
FIG. 1 is a front isometric view of a rangefinder apparatus and a sight indicator positioning device according to the present invention with the rangefinder and sight indicator positioning device being mounted on an archery bow.
Figure 2:
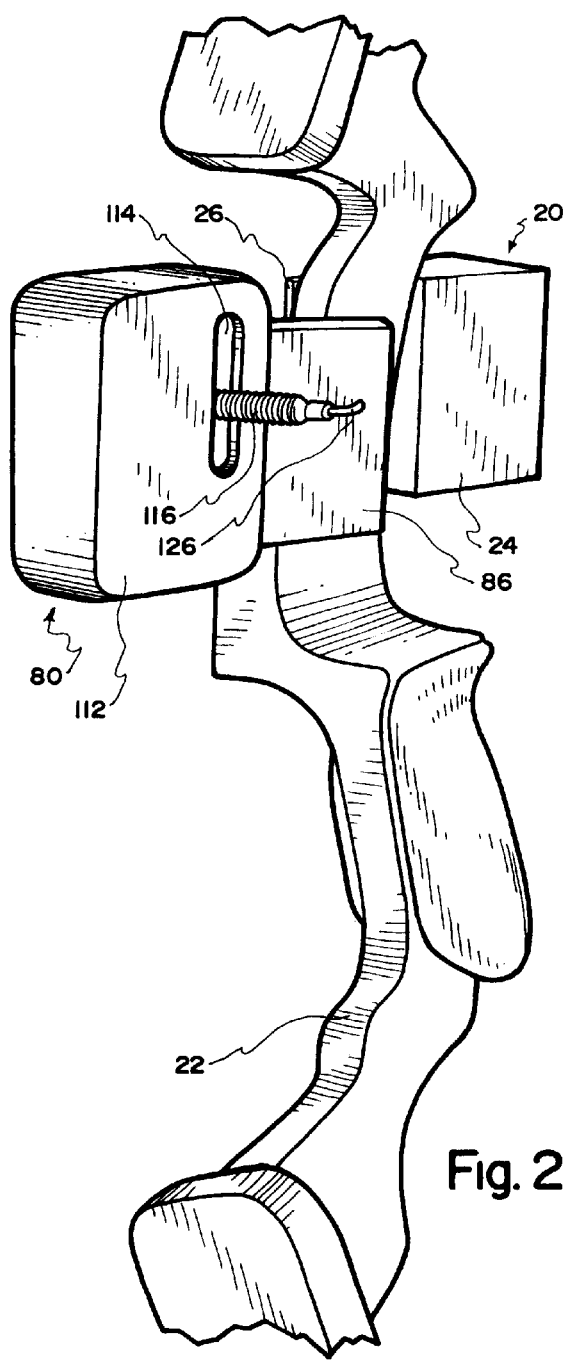
FIG. 2 is a rear isometric view of the rangefinder apparatus and sight positioning device shown in FIG. 1.
Figure 3:
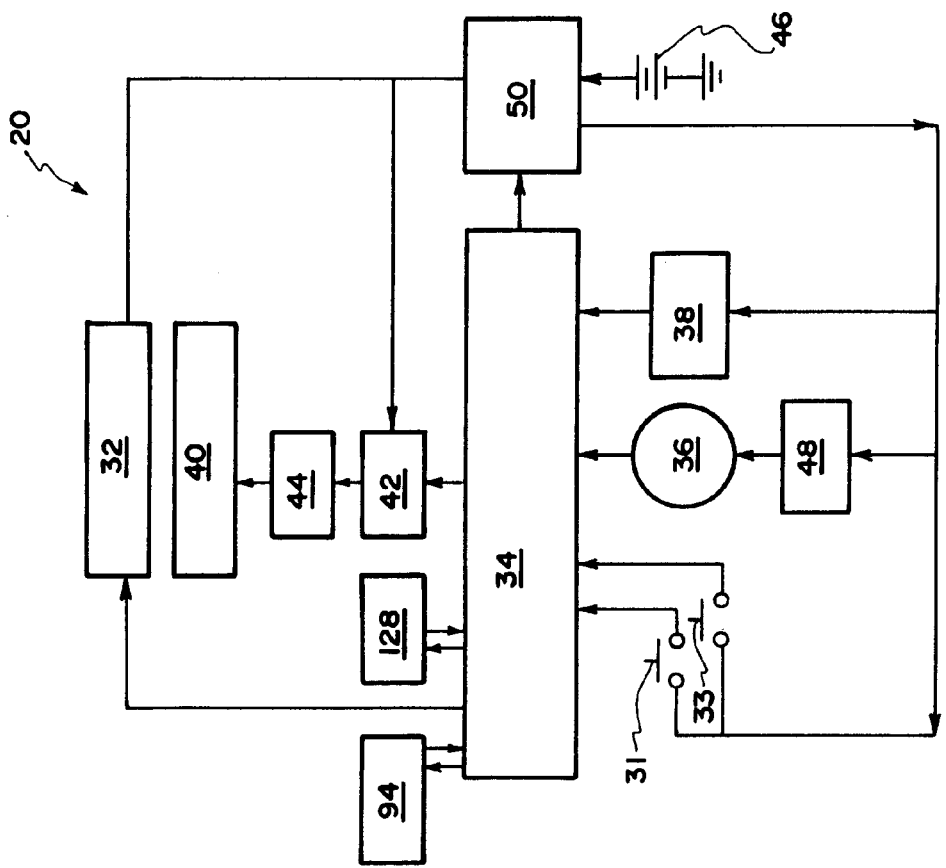
FIG. 3 is a circuit diagram illustrating the internal circuitry and components of the rangefinder apparatus of FIG. 1.

FIGS. 1–3 show a first embodiment of a rangefinding device 20 according to the present invention. FIG. 1 shows the rangefinding device 20 mounted to an archery bow 22. Preferably, the rangefinding device 20 is mounted on the archery bow 22 such that the rangefinding device 20 is oriented substantially parallel to a horizontal plane when the archery bow 22 is aimed parallel to level ground. The rangefinding device 20 is shown as comprising a housing 24 rigidly connected with a mounting plate 26. The mounting plate 26 comprises a plurality of apertures 28 to facilitate the mounting of the rangefinding device 20 to archery bow 22. While the mounting plate 26 is illustrated as being fastened to the archery bow 22 by screws 30, other fasteners, such as bolts, hook and loop fasteners, or the like may be effectively employed.

The rangefinding device 20 further comprises a display 32 disposed on a front surface 35 of the rangefinding device 20. Advantageously, the display 32 comprises a conventional liquid crystal display (LCD) and is used to display information to the user. Input devices such as switch 33 and potentiometer adjustment knob 31 are shown as protruding from the front surface 35 and are used to provide user input to the rangefinding device 20.

With reference to FIG. 3, the rangefinding device 20 internal circuitry and components are illustrated as comprising a programmed data processor 34, which preferably comprises a microprocessor, operatively coupled with an angle sensitive transducer 36. The programmed data processor 34 is suitably programmed to perform trigonometric calculations based on angle dependent signals from the angle sensitive transducer 36. Both the angle sensitive transducer 36 and the programmed data processor 34 are secured within the housing 24 (FIGS. 1 and 2). The display 32 is operatively coupled with the programmed data processor 34 which is programmed to drive the display 32.

The rangefinding device 20 may also advantageously comprise an ambient light sensor 38 operatively coupled with the programmed data processor 34 which continuously monitors the amount of ambient light measured by the light sensor 38. A backlighting device 40 is also operatively coupled with the programmed data processor 34. The programmed data processor 34 is programmed to drive and illuminate the backlighting device 40 when the amount of ambient light measured by the ambient light sensor 38 falls below a predetermined point. This selective illumination of the backlighting device 40 facilitates viewing the display 32 in low light conditions. Additionally, a switching circuit 42 and a voltage regulator 44 are shown as being electrically disposed between the programmed data processor 34 and the backlighting device 40. The switching circuit 42 is biased by the programmed data processor 34 according to the amount of light measured by the ambient light sensor 38 to selectively illuminate the backlighting device 40.

With continued reference to FIG. 3, a battery 46 is provided to provide power to the various circuits and components of the rangefinding device 20. To ensure a substantially constant voltage supply to the angle sensitive transducer 36, and hence minimize potential error resulting from a weak battery 46, a voltage regulator 48 is disposed between the angle sensitive transducer 36 and the battery 46. Additionally, to conserve the battery life of battery 46, the programmed data processor 34 is programmed to control the power provided to all circuits of the rangefinding device 20. Specifically, the programmed data processor 34 is programmed to continually monitor the activity of the angle sensitive transducer 36, to provide power to the rangefinding device 20 upon movement of the rangefinding device, and to eliminate power when the angle sensitive transducer 36 has passed a period of inactivity. This selective energizing of the rangefinding device circuits is accomplished by the programmed data processor 34 selectively biasing a switching circuit 50 according to the activity of the angle sensitive transducer 36. Lastly, switch 33 and adjustment knob 31 are illustrated as being operatively coupled with the programmed data processor 34 to allow the user to input calibration and other information into the programmed data processor 34.

Figure 4:
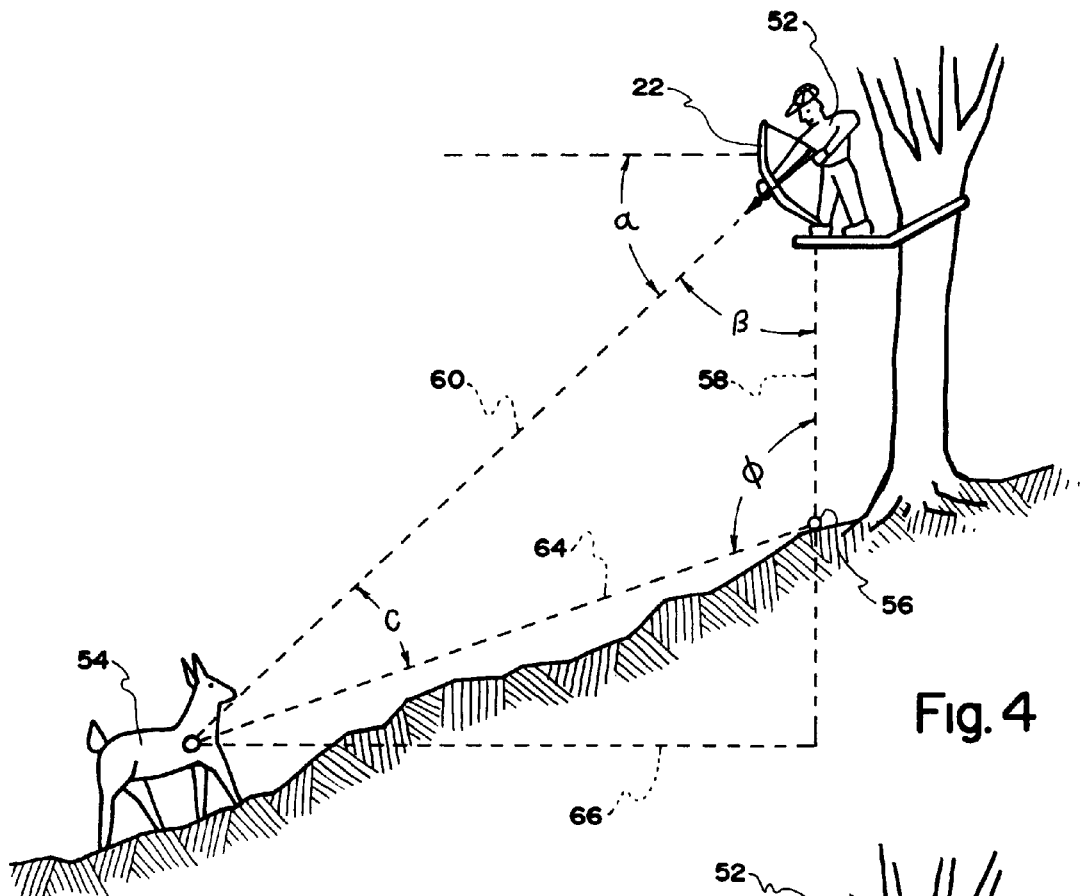
FIG. 4 illustrates an archer shooting at a target from an elevated position above sloped ground.

Turning now to FIG. 4, a triangle is made between an archer 52 at an elevated position, the target 54, and a base point 56 on the ground directly below the archer. As the archer 52 aims the bow 22 at the target 54, an angle $\beta$ is formed between the vertical line 58 which extends from the archer 52 to base point 56 and a line of sight 60 which extends from the archer 52 to the target 54. The complement angle to the angle $\beta$ which is designated in FIG. 3 as inclination angle $\alpha$ is formed between the line of sight 60 and a horizontal line 61 intersecting line 60 at the archer 52. Ground line 64 is shown as extending from the base point 56 to the target 54. A ground angle $\phi$ is formed between the vertical line 58 and the ground line 64. In the special case of the angle $\phi$ between line 58 and line 64 comprising a 90° angle, a right triangle is formed. If this is the case, the angle C made between line 64 and line 60 is the same as the angle $\alpha$. Thus, calculation of the value of the length of line 64, which in this special case is horizontal to the target, is given by one of many possible relationships from elementary trigonometry such as:

Length of Line 64=(Length of Line 58) tan ($\beta$);

or

Length of Line 64=(Length of Line 58)/tan ($\alpha$).

As mentioned above, the programmed data processor 34 is programmable with various subroutines. Several of these subroutines may be used for calibration purposes. For example, the programmed data processor 34 may be programmed with a subroutine for calibrating the device for the case of level ground operation, that is, where the triangle created between the archer 52, the target 54, and the base point 56 comprises a right triangle. In this case, the archer may input the elevation height (length of line 58) by indexing through preprogrammed values stored by the programmed data processor 34 by actuating switch 33.

Figure 5:
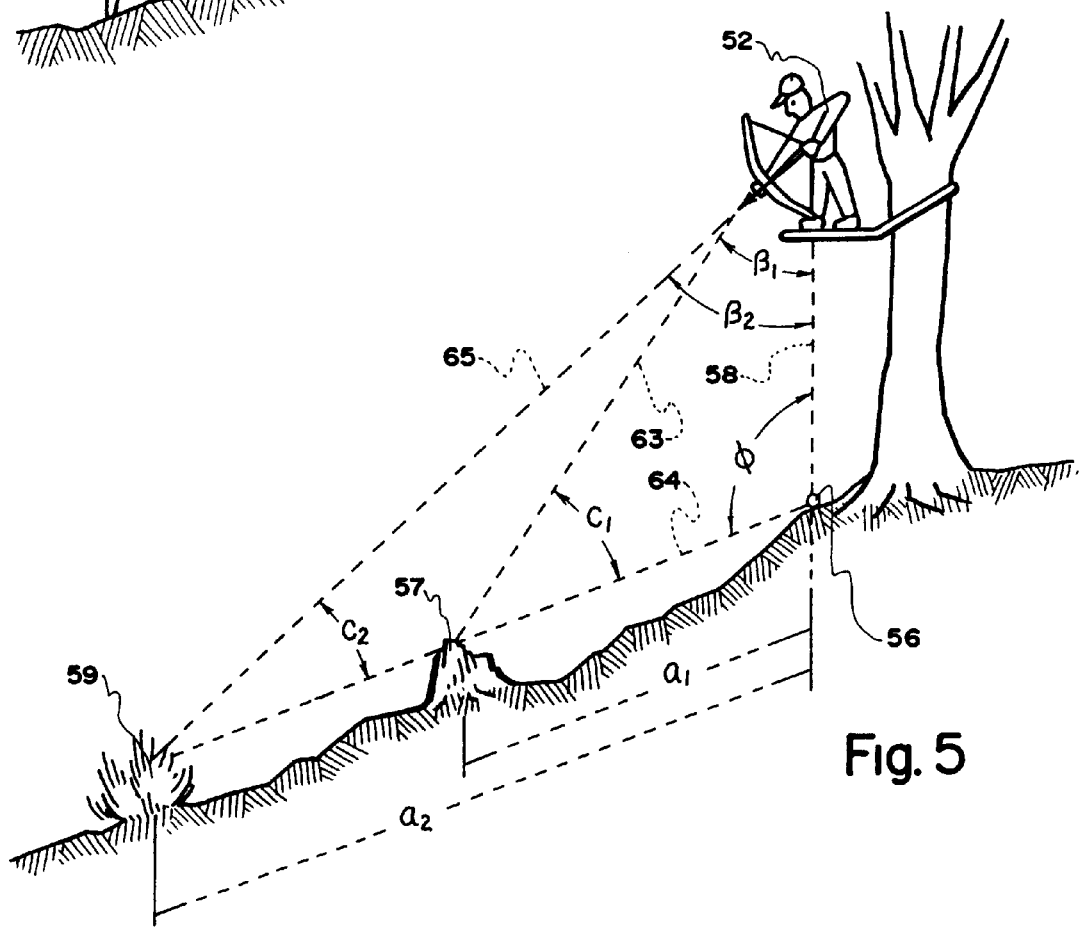
FIG. 5 illustrates an archer elevated above ground aiming at different objects in the vicinity of the archer.

With reference to FIG. 5, an alternative method of calibration for level ground operation will now be described. First, the archer measures the distance a1 from the base point 56 to an object 57 in the near proximity of the shooting area. Upon reaching the point of elevation, the archer then aims the rangefinding device 20 at the object of known distance and actuates switch 33 or turn knob 31 to change the reading seen on the display 32 until the known distance $a_1$ to object 57 is displayed. The programmed data processor 34 may then trigonometrically determine and store the associated elevation height (length of line 58), hence calibrating the device for that height.

For the case of the triangle formed between the archer 52, target 54, and base point 56 comprising a non-right triangle (as illustrated in FIGS. 4 and 5), the value of one additional parameter of the triangle must be known before the remaining leg(s) andor angle(s) of the triangle may be determined using the trigonometric law of sines and cosines.

The programmed data processor 34 may also include a subroutine for calibrating the rangefinder for non-level ground operation (as is the case in FIGS. 4 and 5) where the triangle created between the archer 52, the target 54, and the base point 56 is not a right triangle. With reference to FIGS. 4 and 5, in this subroutine, the elevation height (length of line 58) is set by indexing through preprogrammed values by actuating switch 33. In addition, the user must measure the distance $a_1$ from the base point 56 to an object 57 in the near proximity of the shooting area, and enter this value into the device by indexing through preprogrammed values in much the same way as was used to enter the elevation height. Upon reaching the point of elevation, the archer 52 then aims the rangefinder at the object of known distance, hence allowing the angle sensitive transducer 36 to measure the angle β and provide this angle information to the programmed data processor 34. Switch 33 is then actuated to complete calibration. The programmed data processor then uses trigonometry to calculate the ground angle φ made between line 58 and line 64, which is a constant. An alternative subroutine may be employed to calibrate the rangefinding device for non-level ground operation based on the provision of two calibration data points of known distance. With reference to FIG. 5, this is conceptually illustrated where two triangles are created that share a common leg line 58 and a common angle φ. The first object of known distance is object 57 which is positioned a distance $a_1$ from the base point 56. Likewise, the second object of known distance is object 59 located a distance $a_2$ away from the base point 56. An angle $C_1$ is formed between the ground line 64 and the line of sight 63 between the archer 52 and the object 57. Likewise, an angle $C_2$ is formed between the ground line 64 and the line of sight 65 between the archer 52 and the object 59. Similarly, angles $\beta_1$ and $\beta_2$ are respectively formed between the vertical line 58 and lines 63 and 65. As illustrated in FIG. 5, the elevation height 58 of the archer 52 remains constant. Accordingly, by application of the law of sines, the elevation height 58 may be expressed as:

$$\frac{a_1 \sin C_1}{\sin \beta_1} = \text{elevation height} = \frac{a_2 \sin C_2}{\sin \beta_2}$$

From this equation, it is evident that since $a_1$, $a_2$, $\beta_1$, and $\beta_2$ are knowns, this equation relates the angles $C_1$ and $C_2$ to each other and will provide the desired value of elevation height once either of these angles is known. In order to solve for the unknown angles $C_1$ and $C_2$, another independent relationship must be provided.

Because the sum of the angles of any triangle must be 180°, it is known that:

$$\beta_1 + \phi + C_1 = 180$$

and $$\beta_2 + \phi + C_2 = 180$$

Figure 6:
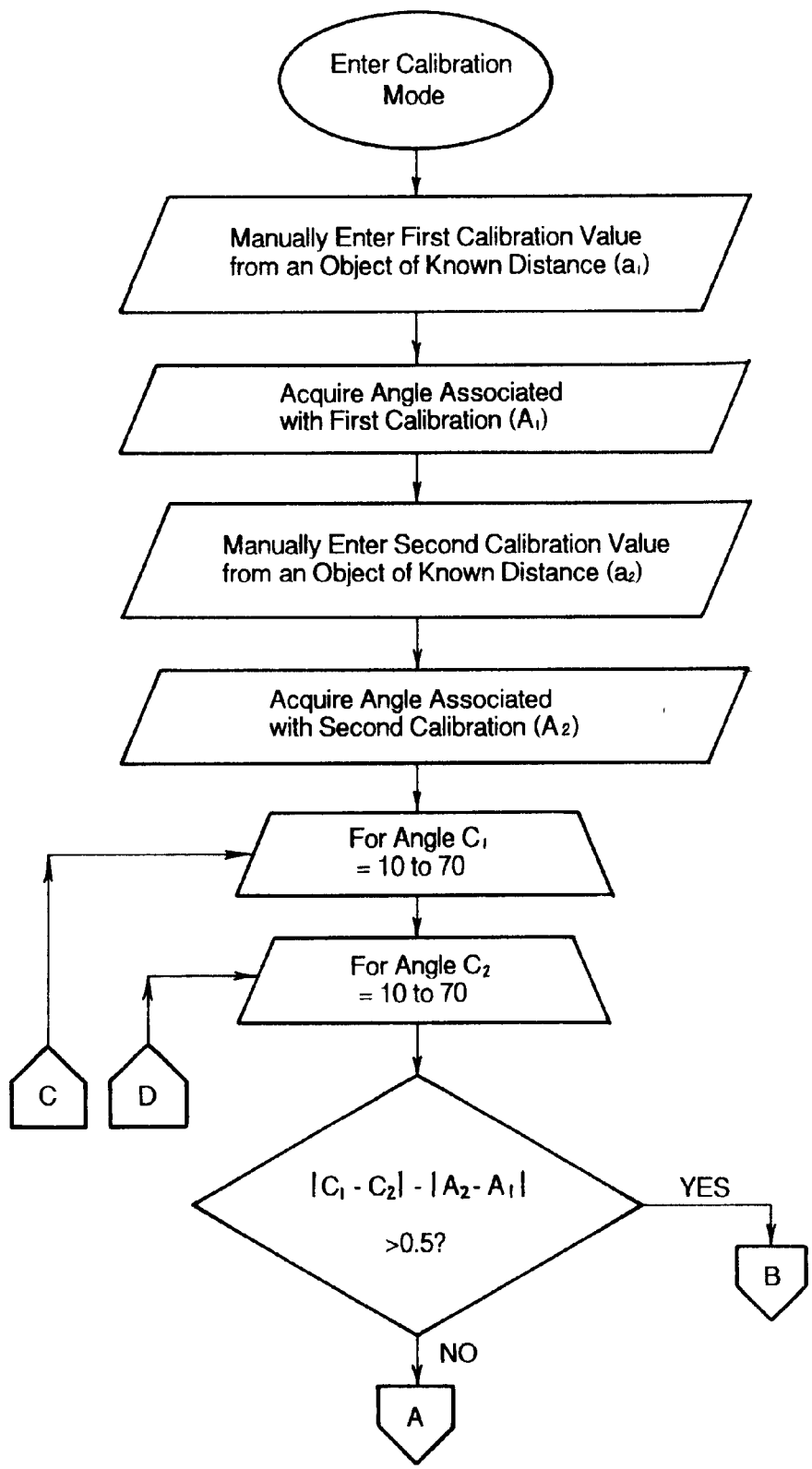
FIG. 6 illustrates a first part of a calibration subroutine.
Figure 7:
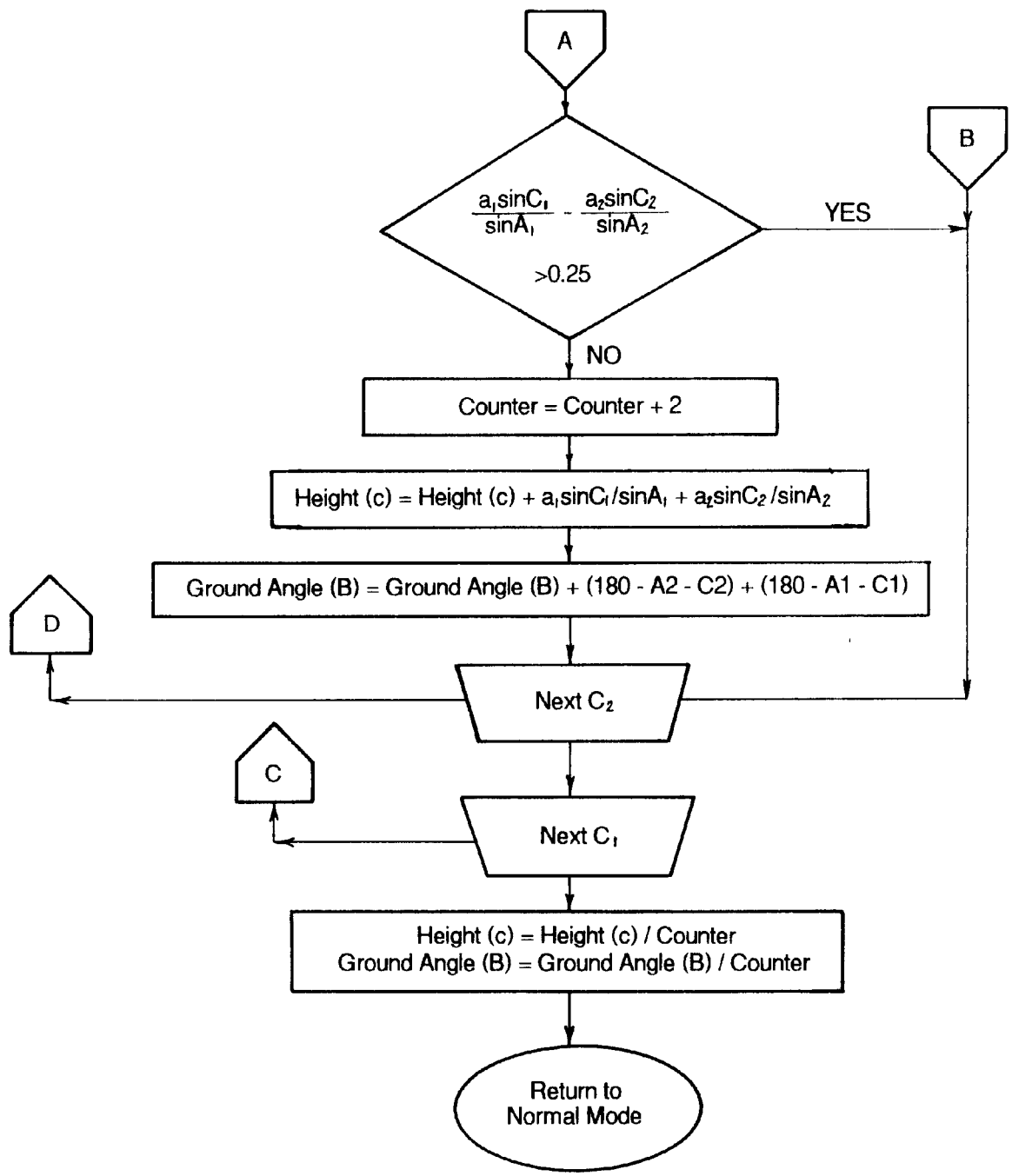
FIG. 7 illustrates a second part of the subroutine of FIG. 5.

Further, since the angle φ, which corresponds to the ground angle, is constant, the following relationship is obtained by combining the above equations:

$$C_1 - C_2 = \beta_2 - \beta_1$$

where $\beta_2 - \beta_1$ is a constant. Thus, with this second independent relationship for the angles $C_1$ and $C_2$, these values can be mathematically determined. Once the angles $C_1$ and $C_2$ are known, the calibration value for the elevation height 58 and the calibration value for the ground angle φ may be computed from the equations described above. An illustrative calibration subroutine which may be programmed into the programmed data processor 34 to accomplish the above-described calibration is shown in FIGS. 6 and 7.

With the values of the elevation height 58 and the ground angle φ known, rangefinding can now be performed on any target along the sloped ground. With reference to FIG. 4, assume that a target 54 is at some arbitrary distance (length of line 64) away from the archer 52. As the archer aims the bow 22 at the target 54, an angle β is formed and is determined by the angle sensitive transducer 36. Since now both angles β and φ are known, the angle C is determined by the relationship:

$$C = 180 - \phi - \beta$$

and the distance (length of line 64), to the target follows by application of the law of sines:

$$\text{Length of Line } 64 = \frac{(\text{Length of Line } 58) \sin \beta}{\sin(180 - \beta - \phi)}$$

While these relationships provide the user with the distance along the ground between a base point and the target (length of line 64), the critical distance is the horizontal component of the distance illustrated by the length of line 64. With reference to FIG. 4, the horizontal component is illustrated as the length of line 66 which forms a part of a right triangle attached to the triangle formed between the archer 52, the target 54, and the base point 56. The line 64 is shared by both triangles. To solve for the length of line 66, it is first recognized that:

$$\theta = 180 - \phi$$

and that:

$$\sin \theta = \frac{\text{Length of Line } 66}{\text{Length of Line } 64}$$

Accordingly, the length of line 66 is given by the equation:

Length of Line 66=(Length of Line 64) sin φ=(Length of Line 64) sin (180−φ)

which leads to a final expression for the horizontal component of distance to the target:

$$\text{Length of Line } 66 = \frac{(\text{Length of Line } 58) \sin \beta \sin(180 - \phi)}{\sin(180 - \beta - \phi)}.$$

It should be noted that alternative equations may be derived to calculate the same horizontal component of distance. However, whatever the specific derivation used to compute the desired result, the fundamental methodology is the same.

The programmed data processor 34 may also be programmed with a subroutine to store the above-described calibration constants in non-volatile memory. For right triangle rangefinding (e.g., tree stand hunting on level ground), as discussed above, the only constant stored is the value of the elevation height (length of line 58). For non-right triangle rangefinding (e.g., tree stand hunting on sloped ground as illustrated in FIGS. 4 and 5), the value of the elevation height (length of line 58) and the value of angle φ are stored by the programmed data processor 34. The subroutine may further provide for the allowance of multiple calibrations to be stored so that the user will not have to recalibrate whenever moving between elevated positions.

The angle sensitive transducer 36 produces voltage levels which correspond to the angle detected by the transducer 36. Accordingly, an additional subroutine with which the programmed data processor 34 may be programmed, reads the voltage of the angle sensitive transducer 36 and correlates that voltage to the angle needed to complete the rangefinding operation. The angle needed to determine the target range may be the angle α or the angle β as illustrated in FIG. 4 depending on the method of trigonometric calculation programmed into the programmed data processor 34. This subroutine may also determine the appropriate trigonometric constant for that angle.

It is also advantageous to provide the programmed data processor with a subroutine which averages the calculated distance (or the calculated horizontal distance) to the target over a period of time between display updates so as to minimize fluctuation of the displayed reading and to increase overall accuracy and repeatability.

Another subroutine with which the programmed data processor 34 may be provided decodes the calculated value of the horizontal distance to the target (length of line 66) and drives the display 32 to show the calculated horizontal distance to the target in a format readable by the user, such as in a numerical format.

Still another subroutine with which the programmed data processor 34 may be advantageously programmed is one which drives the display 32 to display the calibrated value of elevation height (length of line 58) input from switch 33, adjustment knob 31, or both.

Yet another subroutine with which the programmed data processor 34 may be programmed is one which drives the display 32 to show the mode of operation, namely whether the programmed data processor is in calibration mode or in normal mode.

As discussed above, it is desirable for the programmed data processor 34 to monitor the activity of the angle sensitive transducer 36 to determine when the rangefinder 20 should be energized. Accordingly, the programmed data processor 34 may be advantageously programmed with a subroutine which monitors the activity of the angle sensitive transducer 36 and which selectively energizes the circuits and components of the rangefinder 20 according to the activity of the angle sensitive transducer by selectively biasing the switching circuit 50 (FIG. 3).

It is also desirable to illuminate the display 32 by a backlighting device 34 driven by the programmed data processor 34 when the amount of light measured by the ambient light sensor 38 falls below a predetermined point. Thus, it is desirable that the programmed data processor 34 be programmed with a subroutine which monitors the amount of light measured by the ambient light sensor 38 and biases a switching circuit 42 to selectively illuminate the backlighting device 40 according to the amount of ambient light measured by the ambient light sensor 38.

To permit the archer to perform rangefinding operations in different units of measure, the programmed data processor is also programmed with a subroutine which converts input calibration distances and calculated distances into various units of measure, such as: yards, meters, or paces.

In operation, the user 52 ascends to the point of elevation from which he or she will be using the rangefinding device 20. The rangefinding device 20 is operated by first calibrating it as described above, depending on the slope of the ground present, that is, flat or inclined. The calibration information for this particular elevation is then stored in the programmed data processor and hence no further calibration, for future operation at this site, is needed. After calibration, the user simply aims at the target 54, causing the bow-mounted or otherwise held rangefinder 20 to rotate about a horizontal axis. The angle sensitive transducer 36 sends a substantially continuous signal to the programmed data processor 34 which is then correlated by the programmed data processor to the appropriate angle and trigonometric ratio needed to calculate the distance to the target, depending on the program as described above.

The programmed data processor 34 next determines the distance to the target based on the measured angle. Additionally, the programmed data processor 34 averages distance values over a brief period of time and drives the display 32 to show the range in a format readable by the user, such as a numerical format. The units of measure being used, such as yards, meters, or paces, may also be shown on the display 32. Alternate modes of operation, such as display of height instead of horizontal distance to the target can be employed at any time by enabling such modes by actuating switch 33. The rangefinding device continually monitors the activity of the angle sensitive transducer 36 to control the powering of the device, de-energizing the device after a predetermined period of inactivity and energizing the device immediately upon resumption of transducer activity. Alternatively, a separate transducer to control the selective powering of the rangefinder 20 may be used to optimize the battery life of the battery 46, especially if the angle sensitive transducer 36 has a high current drain.

With reference now to FIGS. 1–3 and 8–11, an additional feature of the present invention will now be described, namely an electro-mechanical linear positioning mechanism 80 which is used to locate a sight indicator to a predefined point. The exact location of this point may be predetermined based upon shot conditions, such as range and arrow velocity. As illustrated, the electro-mechanical positioning mechanism 80 is illustrated as comprising a housing 82. The housing 82 is shown as being rigidly affixed to an archery bow 142 by a substantially L-shaped bracket 84.

Figure 8:
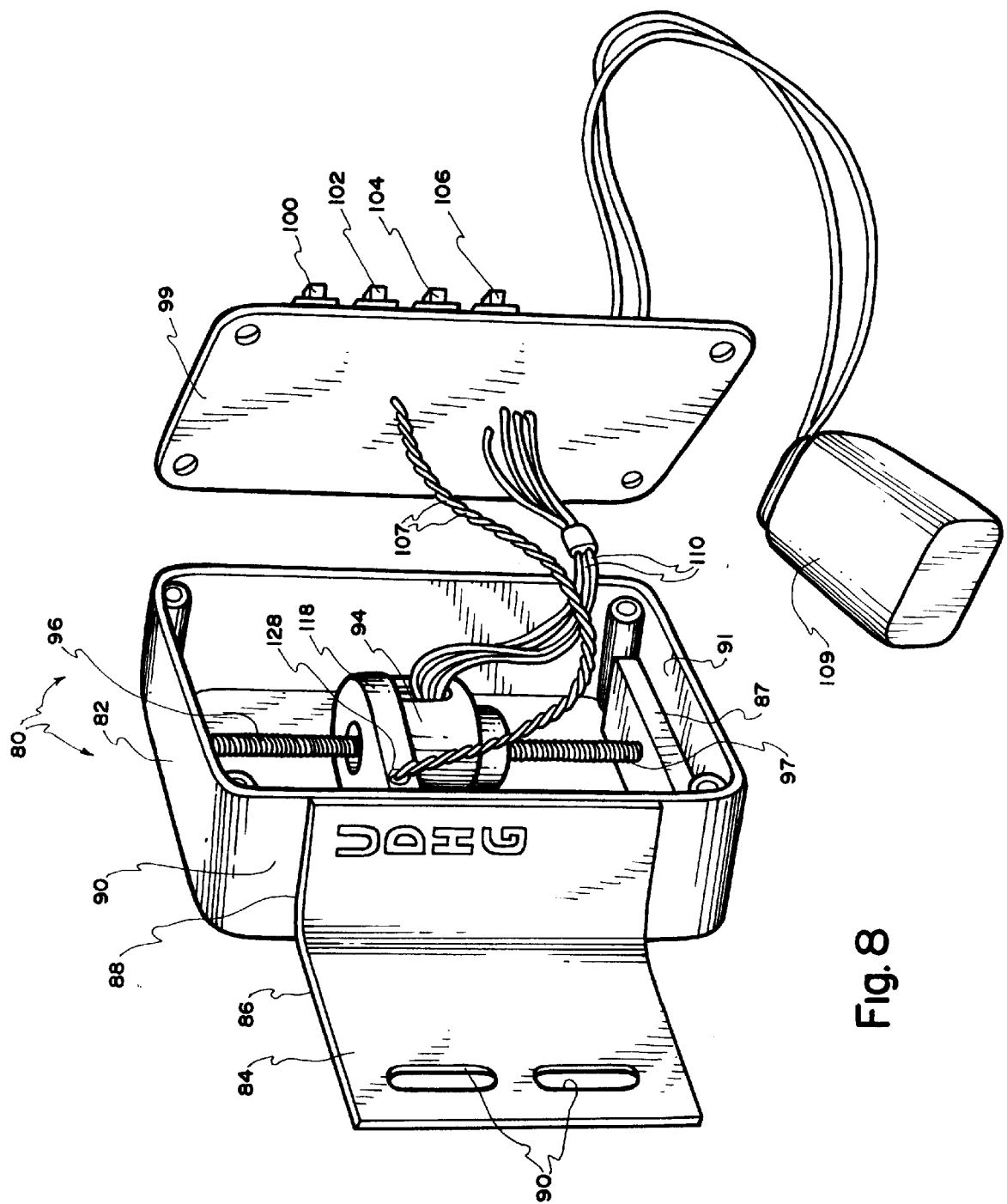
FIG. 8 is a perspective view of an electro-mechanical positioning sight indicator mechanism with the circuit board removed.

The L-shaped bracket 84 is illustrated in FIG. 8 as comprising two substantially perpendicularly oriented portions 86 and 88. Portion 88 of the L-shaped member 84 is rigidly affixed by any suitable manner to an exterior surface 90 of the housing 82. Portion 86 of the L-shaped bracket 84 is illustrated as extending substantially perpendicularly from portion 88. To assist in securing the electro-mechanical positioning system 80 to an archery bow 142, apertures 90 are formed in the L-shaped bracket portion 86 to permit the L-shaped bracket portion to be securely fastened to a conventional archery bow 83 via fasteners 92 which extend through the apertures 90 to rigidly affix the positioning mechanism 80 to conventional apertures formed in the archery bow 83.

Figure 9:
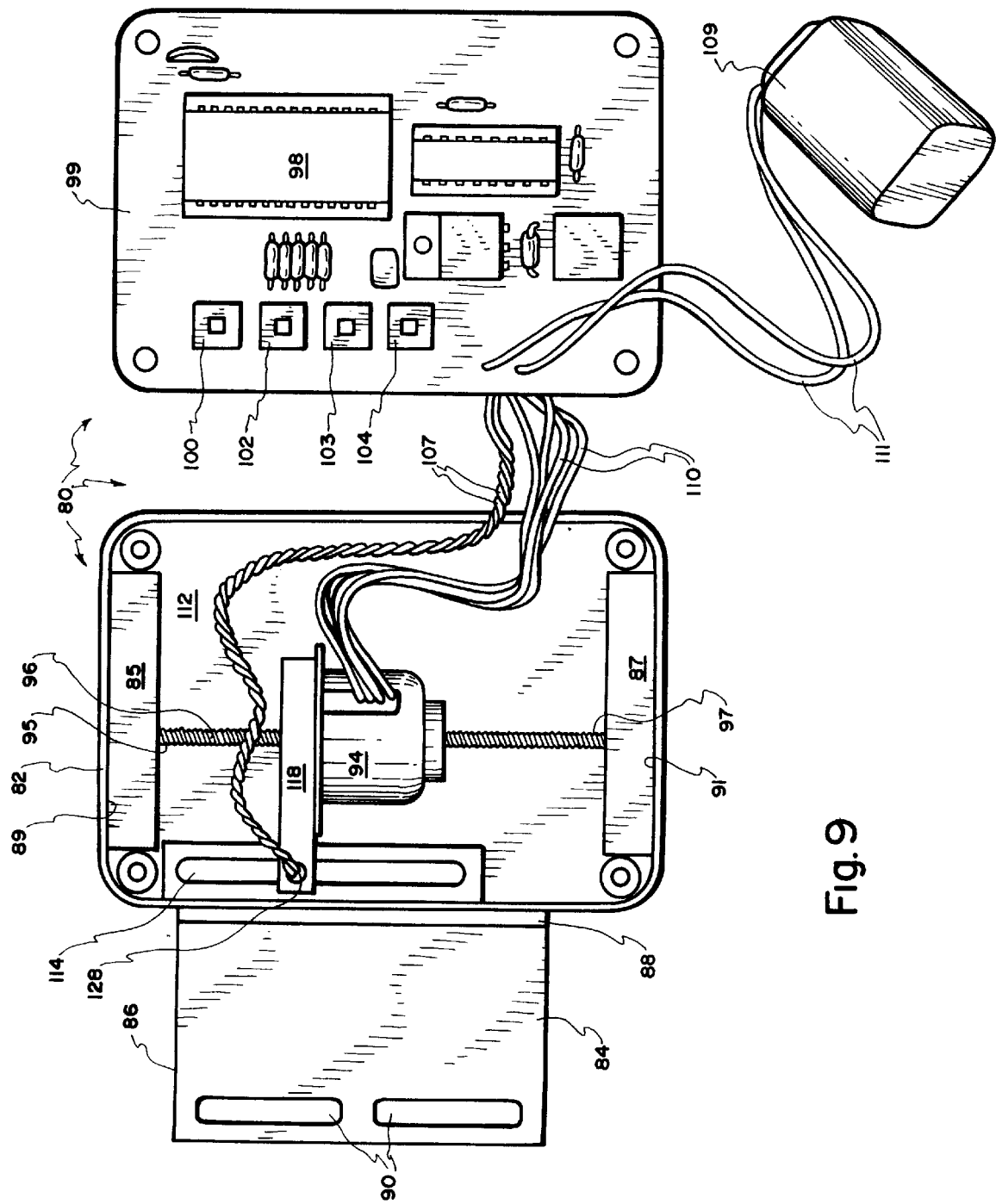
FIG. 9 is a side elevation view of the electro-mechanical sight indicator positioning mechanism of FIG. 8 with the circuit board removed.

Referring now to FIGS. 8 and 9, the electro-mechanical positioning mechanism 80 is illustrated as comprising a motor 94, such as a stepper motor, and a threaded actuator shaft 96. The threaded actuator shaft 96 is secured within the housing 82 by blocks 85 and 87. The blocks 85 and 87 are rigidly affixed to the interior surfaces 89 and 91 respectively of the housing 82. As shown, a top end 95 of the shaft 96 is secured within block 85 and a bottom end 97 of the shaft 96 is secured within block 87. While blocks 85 and 87 may be formed of a wide variety of suitable materials, they are preferably formed of plastic.

The motor 94 advantageously comprises a stepper motor having the ability to drive its center shaft to incremental, linear positions along the axis of the threaded actuator shaft 96 with a repeatability on the order of 0.001 inch. Thus, the stepper motor allows for infinitely variable adjustments within the limits of shaft 96. Stepper motors are particularly suitable for use as motor 94 because, unlike analog AC or DC motors, they rotate in discreet increments when provided with electrical impulses from a controlling circuit. Thus, by controlling the number of applied electrical pulses, exceptional repeatability of motion is attained. To achieve good repeatability and resolution it is desirable to employ a stepper motor capable of fractional degrees of rotation per electrical pulse. A stepper motor having a resolution on the order of approximately 0.0004 inches is satisfactory.

To control the position of the motor 94 along the threaded actuator shaft 96, still referring to FIGS. 8 and 9, a programmed data processor 98, shown as being disposed on circuit board 99, may be used to generate and track the electrical pulses which drive the motor 94. Using a programmatically defined "home" position as a reference, the programmed data processor 98 determines the number of pulses needed to position the actuator at any one of various predefined locations. Advantageously, the electro-mechanical positioning mechanism 80 has two modes of operation, a "teach" mode and a "return" mode. When the user completes the teach mode of operation, the programmed data processor 98 is, in essence, being taught the number of pulses from the "home" reference position necessary to move the motor 94 to various set positions. Then, when the device is used in the return mode of operation, the programmed data processor 98 compares the current location of the motor 94 (by knowing the number of pulses at which it stands from the reference) to the desired position. The programmed data processor 98 then mathematically computes the number of pulses needed to drive the motor 94 to its new location, along with the direction of travel needed, and outputs the necessary electrical pulses to drive the motor 94 to that new position.

Control of the programmed data processor 98 may be achieved by a series of input devices such as switches 100, 102, 104, and 106. The input devices may alternatively comprise a potentiometer. Preferably, the number of switches is minimized to simplify device operation. The teach mode of operation is begun by actuating switch 100 which programmatically defines the current sight indicator position as the "home" position. Then switch 102 is used to manually actuate the positioning mechanism upward, while switch 104 manually activates the device downward. A yet additional switch 106 indicates to the programmed data processor 98 that a desired position has been achieved, and that position is stored for a defined shot condition. For example, location storage positions maybe included for shots of 20, 25, 30, 35, and 40 yards. These shot distances associated with the storage locations are arbitrary, and could easily be changed.

In the "return" mode of operation, actuation of switches 100 and 102 toggles a programmed data processor 98 between storage locations. To indicate the current storage location to a user, a feedback device may be used. The feedback device may comprise a display 32 (FIG. 1), such a liquid crystal display, that displays the current yardage location or may comprise any number of other conventional displays.

Switch 102 may indicate to the programmed data processor 98 to move the sight indicator location downward, that is, change the yardage to a higher value. Upon closure of this switch, the programmed data processor 98 positions the motor 94 to the next higher position as previously defined. Alternatively, switch 100 could be used to index the sight indicator to the next position upward, changing the yardage location to a lower value. The programmed data processor 98 sends electrical pulses to the motor 94 via electrical conduits 110.

Figure 10:
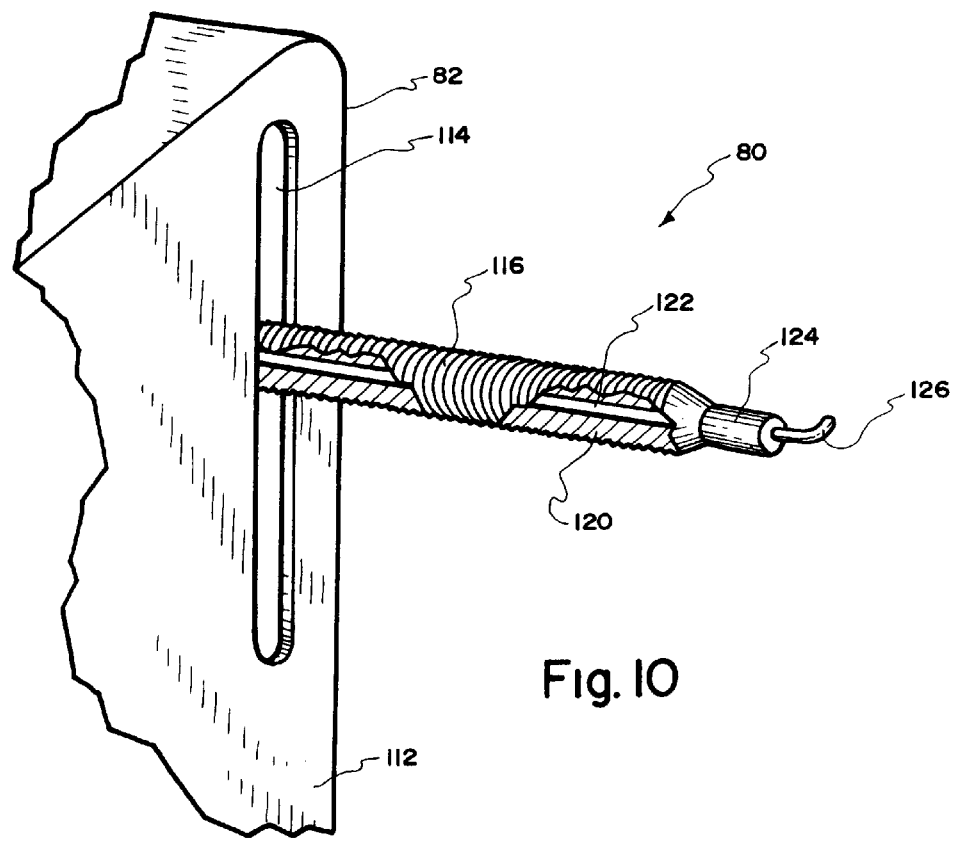
FIG. 10 is a perspective sectional view of the sight indicator of the electro-mechanical positioning mechanism.

In FIGS. 9 and 10, the housing 82 is illustrated as comprising a rear wall 112 which has formed therein an elongated aperture 114. A sight indicator 116 is illustrated as extending through the elongated aperture 114 and being connected to the stepper motor 94 by a coupler 118 which is rigidly affixed to both the sight indicator 116 and the stepper motor 94. In this configuration, the sight indicator 116 can be selectively, and accurately moved, by the above-described upward and downward movement of the motor 94 along the actuator shaft 96.

As illustrated in FIG. 10, the sight indicator 116 is illustrated as comprising a hollow tube 120 with a fiber optic cable 122 disposed within the hollow tube 120. The hollow tube 120 is also shown as comprising a reduced diameter end 124. The fiber optic cable 122 further comprises fiber optic cable end 126 which extends out from the reduced diameter end 124 of hollow tube 120. The end of the fiber optic cable 122 opposite the fiber optic cable end 126 is operatively coupled with a light emitting diode 128, which advantageously comprises a multi-color light emitting diode. In this configuration, illumination of the light emitting diode 128 illuminates the entire length of the fiber optic cable 122.

In operation, the sight indicator 116 provides the user with a single point of light at fiber optic cable end 126 as a sight. In one embodiment, switching circuitry causes the light emitting diode 128 to glow one color, such as red, while motion is being imparted to the sight indicator 116 by the motor 94. Alternately, the switching circuit causes the light emitting diode to glow a second color, such as green, when the motion of the motor 94 has ceased and the sight indicator 116 is properly positioned. The changing color of the light emitted from the fiber optic cable end 126 permits the user to know that when fiber optic cable end 126 is one color, such as red, the positioning operation is still in progress and when fiber optic cable end 126 is illuminated by a second color, such as green, that the moving operation of the sight indicator is complete and the sight indicator is properly positioned. While colors red and green may be used as light emitting diode colors as described above, virtually any set of colors could be effectively employed.

Additionally, the electro-mechanical positioning mechanism 80 may be used together with the rangefinding device 20 illustrated in FIGS. 1 and 2. As shown in FIGS. 1 and 2, the electro-mechanical positioning mechanism 80 is rigidly affixed to the archery bow 22. In this configuration, the motor 94 (FIGS. 8 and 9) may be driven by either programmed data processor 34 or programmed data processor 98. Thus, the linear position of the sight indicator 116 may either be manually controlled by the user's selective activation of the switches 100, 102, 104, and 106 as discussed above or it can be automatically controlled by the programmed data processor 32 (FIG. 3) according to its range calculations.

The circuit board 99 is illustrated as being connected to a battery 109 by electrical conduits 111. The battery 109 provides power to the device 80. Additionally, the light emitting diode 128 is illustrated as being coupled with the programmed data processor 98 via electrical conduits 107 and the circuit board 99.

Figure 12:
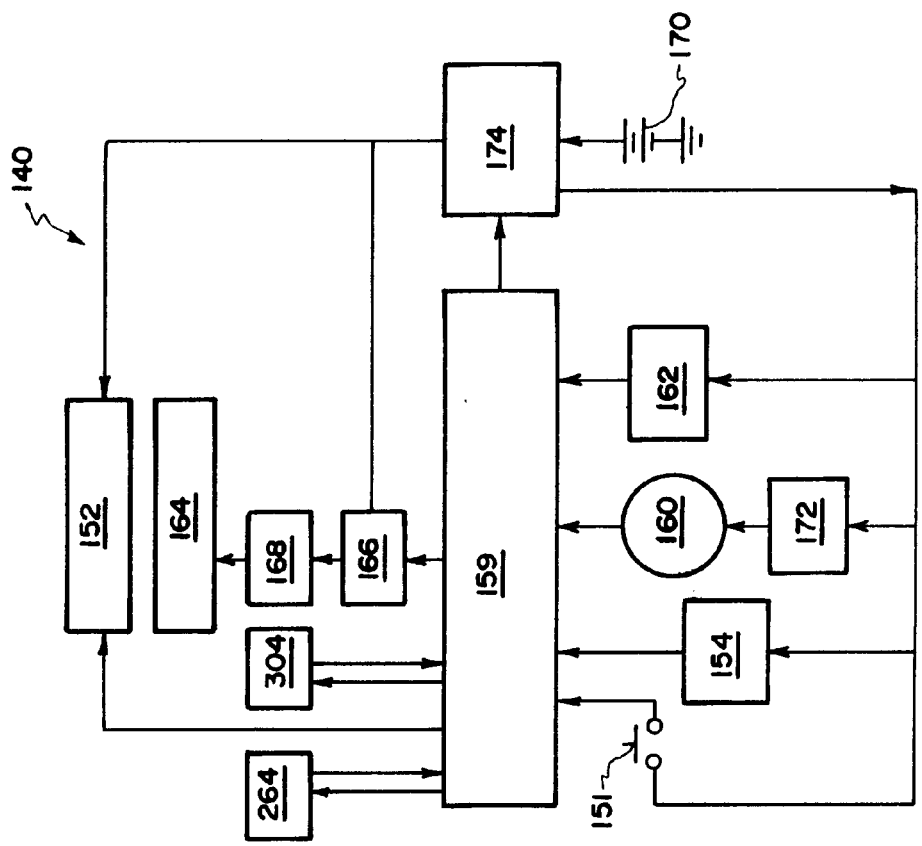
FIG. 12 is a circuit diagram illustrating the internal circuitry and components of the rangefinder shown in FIG. 11.
Figure 13:
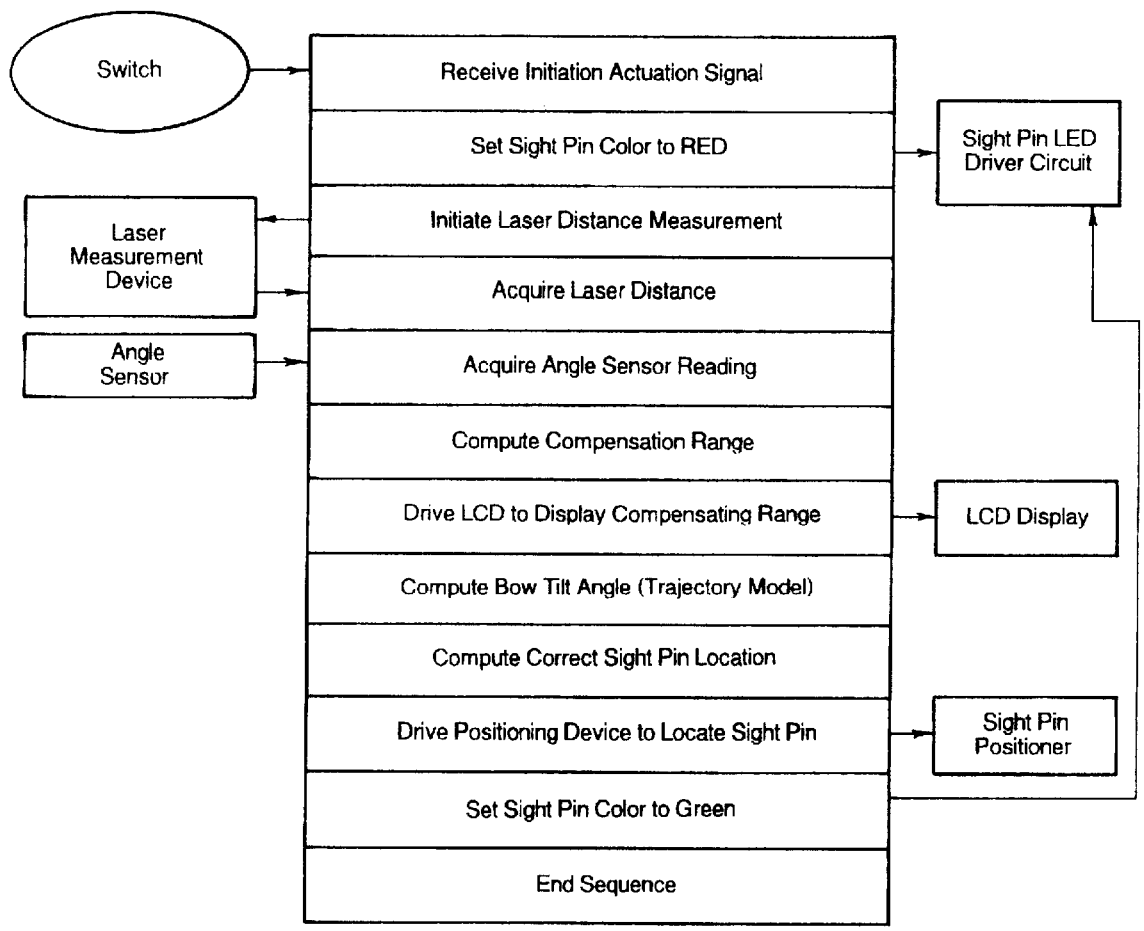
FIG. 13 is a flow chart illustrating a sequence of operation of the programmed data processor shown in FIG. 12.

FIGS. 11–13 show yet another alternative embodiment of the present invention, namely, a rangefinder 140 which employs a point-to-point measuring device. FIG. 11 shows the rangefinder 140 mounted to an archery bow 142. Advantageously, the rangefinder 140 is mounted on the archery bow 142 such that the rangefinder 140 will be oriented substantially parallel to a horizontal plane when the archery bow 142 is aimed parallel to level ground. The rangefinder 140 is shown as comprising a housing 144 rigidly connected with mounting plate 146. The mounting plate 146 comprises a plurality of apertures 148 formed therethrough to facilitate the mounting of the rangefinder 140 to archery bow 142. While the mounting plate 146 is illustrated as being fastened to the archery bow 142 by screws 150, other fasteners, such as bolts, hook and loop fasteners, or the like may also be effectively employed.

The rangefinder 140 further comprises a display 152 disposed on a front surface 151 of the rangefinder 140. Advantageously, the display 152 comprises a conventional liquid crystal display (LCD) and is used to display information to the user. As an input device, switch 153 is shown as protruding from the front surface 151.

To provide point-to-point distance measurements, a point-to-point measuring device 154, such as a laser point-to-point measuring device, is affixed to the housing top surface 156. Although the point-to-point measuring device 154 is shown as being affixed to the housing top surface, the point-to-point measuring device 154 may be effectively mounted in a variety of locations. As shown, the point-to-point measuring device 154 further comprises an input device such as actuating switch 158 which may be used to selectively actuate the point-to-point measuring device 154.

With reference to FIG. 12, the rangefinding device 140 is further illustrated as comprising a programmed data processor 159, which preferably comprises a microprocessor, operatively coupled with an angle sensitive transducer 160 and the point-to-point measuring device 154. The programmed data processor 159 is suitably programmed to perform trigonometric calculations based on angle dependent signals from the angle sensitive transducer 160 and point-to-point distance dependent signals from the measuring device 154. Both the angle sensitive transducer 160 and the programmed data processor 159 are secured within the housing 144 (FIG. 11). As illustrated, the display 152 is operatively coupled with the programmed data processor 158 which is programmed to drive the display 152.

The rangefinder 140 may also advantageously comprise an ambient light sensor 162, a backlighting device 164, a voltage regulator 168, and a switching circuit 166. The backlighting device 164, the ambient light sensor 162, the voltage regulator 168, and the switching circuit 166 are identical to and configured identically with the backlighting device 40, the voltage regulator 44, the switching circuit 42, and the ambient light sensor 38 described above in connection with FIG. 2. Likewise, battery 170, voltage regulator 172, switching circuit 174, switch 176, and angle sensitive transducer 160 are also identical to the battery 46, voltage regulator 48, switching circuit 50, switch 33, and the angle sensitive transducer 36 described above in connection with FIG. 2. Additionally, the programmed data processor 159 may also contain the subroutines described in connection with the programmed data processor 34 described in connection with FIG. 2.

Additionally, the rangefinder 140 may be advantageously used in concert with the electro-mechanical positioning mechanism 80 previously described in connection with FIGS. 8–10. As shown in FIG. 11, the electro-mechanical positioning mechanism 80 is rigidly affixed to the bow 142. In this embodiment, the electro-mechanical positioning mechanism motor 94 (FIGS. 8 and 9) is operatively coupled with, and driven by, the programmed data processor 159.

FIG. 13 illustrates a sequence of operation that may be effectively employed by the programmed data processor 159. First, to commence the rangefinding operation, switch 151 is actuated by the user, which actuation is received by the programmed data processor 159. Next, the programmed data processor 159 drives the light emitting diode 128 of the electro-mechanical positioning mechanism 80 to a particular color, such as red, to indicate to user that the sight indicator position is being adjusted. The programmed data processor 159 then initiates the point-to-point distance measurement by driving the point-to-point measuring device 154, which may comprise a laser point-to-point measuring device, to obtain the point-to-point distance to the target and to return that distance to the programmed data processor 159. With the point-to-point distance determined, the programmed data processor next acquires elevation angle information from the angle sensor 160. With the point-to-point distance and the elevation angle information, the programmed data processor 158 then computes the horizontal distance to the target using trigonometric relationships.

Once the horizontal distance to the target calculated, the programmed data processor 159 drives the display 152 to display the horizontal distance to the target for the user.

Figure 14:
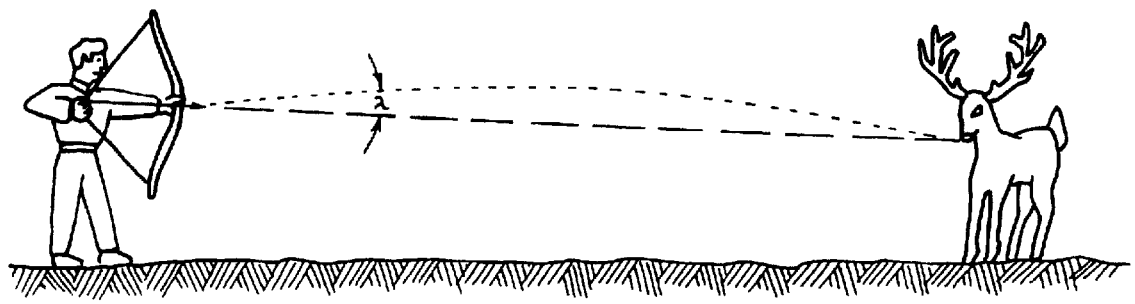
FIG. 14 illustrates the bow tilt angle for a shot on substantially level ground.
Figure 15:
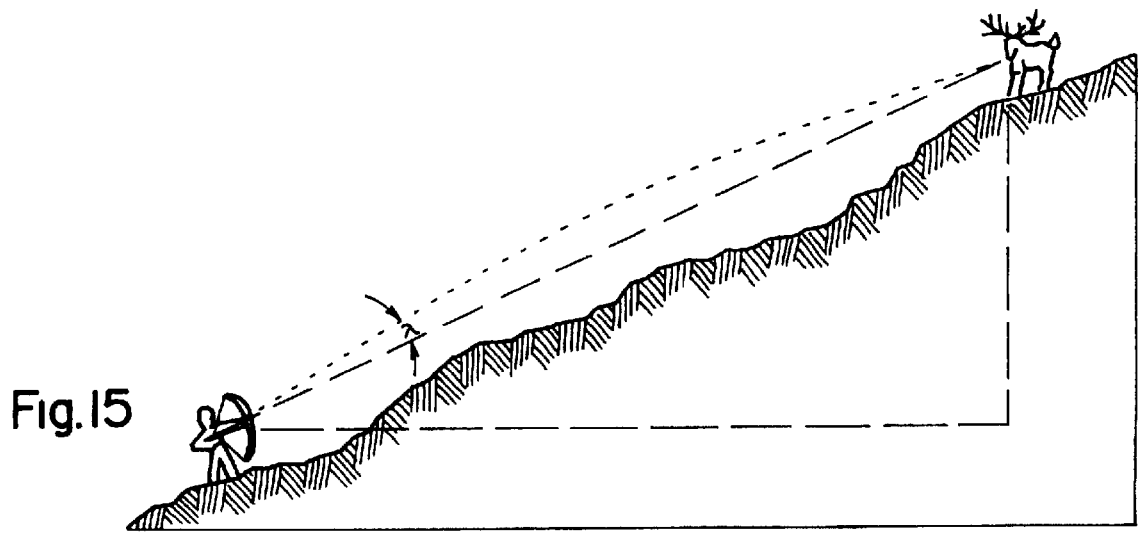
FIG. 15 illustrates the bow tilt angle for an uphill shot.
Figure 16:
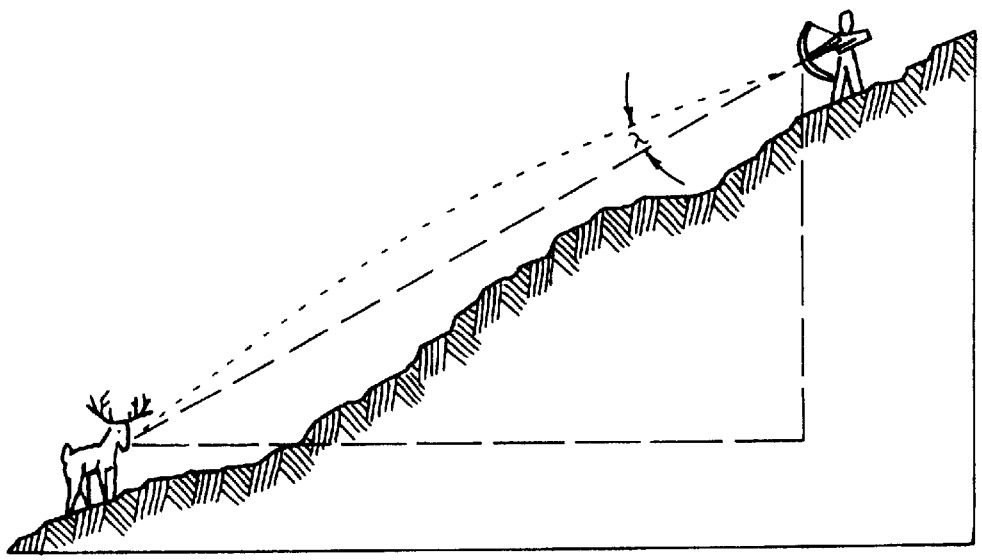
FIG. 16 illustrates the bow tilt angle for a downhill shot.

Then, the programmed data processor 159 computes a bow tilt angle λ which is the necessary tilt angle of the bow 142 necessary to compensate for the drop of an arrow due to gravity as it is shot from a bow to a target using a mathematical arrow flight trajectory model (with reference to FIGS. 14–16), such as:

$$y = R\tan\lambda \sin\beta - \frac{g}{2v_0^2 \cos^2\lambda} R^2 \sin^2\beta.$$

In this mathematical model, the value of y is set to zero, the magnitude of the initial arrow velocity $v_o$ is a preset constant, and the programmed data processor calculates the tilt angle λ using the arrow flight trajectory model above. Once the tilt angle λ is calculated, the programmed data processor 159 calculates the appropriate position of the sight indicator of the electro-mechanical positioning mechanism 80 so that when the sight indicator is aligned with the target, the archer's bow will be angled relative to the line of sight to the target at the necessary bow tilt angle. With the proper position of the sight indicator determined, the programmed data processor 159 drives the electro-mechanism positioning mechanism 80 to properly locate the sight indicator. Once the sight indicator is properly positioned, the programmed data processor 159 drives the light emitting diode 128 of the electro-mechanical positioning mechanism 80 to another color, such as green to indicate to the user that the sight indicator is properly positioned for a given shot. This step marks the end of the programmed data processor sequence.

Prior to operation of the rangefinder 140, certain measures must be done to calibrate the device 140. As was pointed out above, the velocity ($v_o$) of the arrow leaving the bow 142 is a parameter that needs to be considered in determining arrow trajectory. While the velocity ($v_o$) of the arrow leaving the bow could easily be measured and directly input to the programmed data processor 150, in the present embodiment this parameter is determined programmatically. To calibrate the system, the programmed data processor 159 cycles through a series of "internal" compensating ranges such as: 20 yards, 30 yards, and 40 yards. The switches 100–106 allow the user to move the sight indicator 116 up and down. The user then fires practice shots with the archery bow 142. When the user is satisfied that the indicator is correctly positioned for the internal compensating ranges, another switch actuation "teaches" the programmed data processor 159 that the indicator 116 is in the correct position for that range. Thereafter, the programmed data processor 159 computes what the velocity of the arrow must be, based on the above-described mathematical arrow trajectory model. This sequence is then repeated for the other internal compensating ranges, thus providing the programmed data processor 159 with a total of three initial velocity calculations. Although these three velocities should be substantially the same, some variation may be expected. Accordingly, an average velocity based on the three calculated velocities is then computed and stored in memory, to calibrate the device for use.

Figure 18:
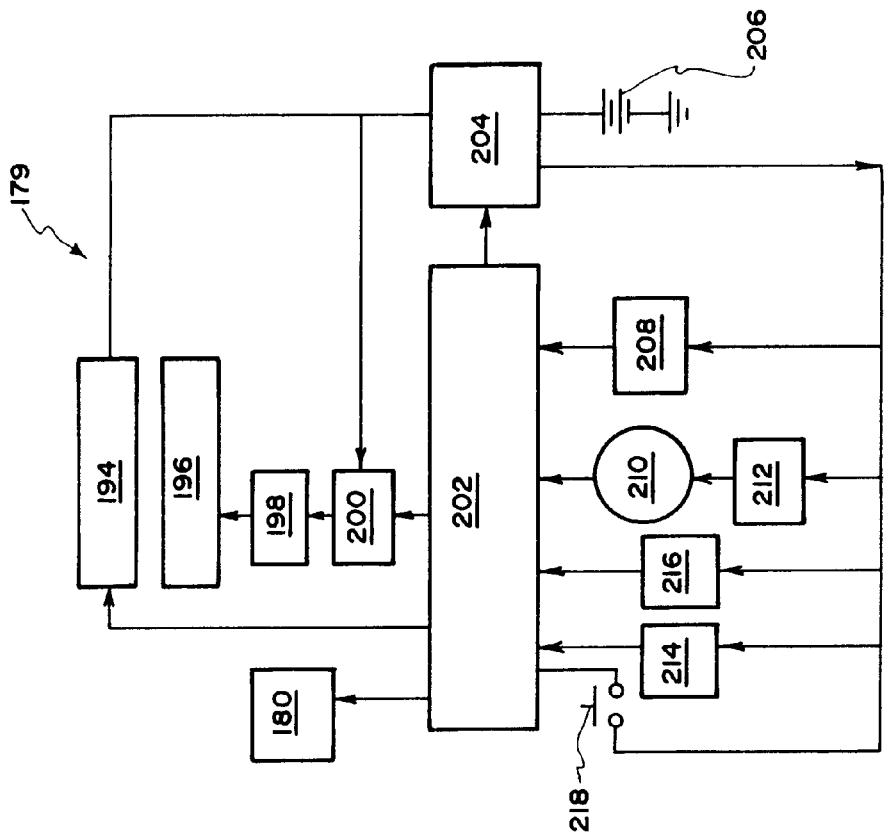
FIG. 18 is a circuit diagram of the rangefinder shown in FIG. 17.

A yet additional embodiment of the present invention, rangefinder 179, is illustrated in FIGS. 17 and 18. This embodiment is similar to the previously described embodiment illustrated in FIGS. 11–13, but rather than utilizing an electro-mechanical sight positioning mechanism, this embodiment uses a liquid crystal display 180 which has the capability of making visible one of a plurality of vertical lines 182 and one of a plurality of horizontal lines 184 to produce a movable cross hair sight. As illustrated, other information may also be displayed on liquid crystal display 180 such as distance to the target information 186 and wind direction information 188.

As illustrated in FIG. 17, the display 180 is shown as being rectangular and comprising a rigid extension member 190 which permits the display 180 to be rigidly mounted on archery bow 192. With reference now to FIG. 18, a circuit diagram similar to that illustrated in FIG. 12 which shows the various components of the rangefinder 179 is provided. The rangefinder 179 is illustrated as comprising a display 194, a backlighting device 196, a voltage regulator 198, a switching circuit 200, and a programmed data processor 202. The display 194, backlighting device 196, voltage regulator 198, and switching circuit 200 are identical to and configured identically as the display 152, backlighting device 164, voltage regulator 168, and switching circuit 166 of the above-described rangefinder 140 (FIG. 12). Likewise, switching circuit 204, battery 206, ambient light sensor 208, angle sensitive transducer 210, and voltage regulator 212 are identical to and configured identically with the switching circuit 174, battery 170, ambient light sensor 208, angle sensitive transducer 160, and voltage regulator 172 of the rangefinder 140 illustrated in FIG. 12. Additionally, a point-to-point measuring device 214, which may comprise a laser point-to-point measuring device, and windage sensor 216 are operatively coupled with the programmed data processor 202 to provide point-to-point distance information and windage information to the programmed data processor 202. Lastly, a switch 218 is provided. As shown, the display 180 is operatively coupled with the programmed data processor 202 programmed to display information and cross hairs on the display 180.

In operation, in a manner identical to the manner of operation of the rangefinder 140 discussed above, the programmed data processor 202 calculates the horizontal distance to the target based upon a point-to-point distance measurement and the angle detected by the angle sensitive transducer 210. While the display 180 is illustrated as having a number of horizontal and vertical lines visible, this is for illustrative purposes only. At any given time, only one set of horizontal 184 and vertical 182 lines are visible. Specifically, the horizontal line visible would be determined by the programmed data processor 202 according to the horizontal distance to the target calculated by the programmed data processor 202. The vertical line visible would be determined by the programmed data processor based on the readings of the windage sensor 216 which are received by the programmed data processor 202. By selectively making visible a set of horizontal and vertical lines on the display 180, a movable set of cross hairs is provided which move according to the horizontal distance to the target, current wind conditions, or both.

Figure 19:
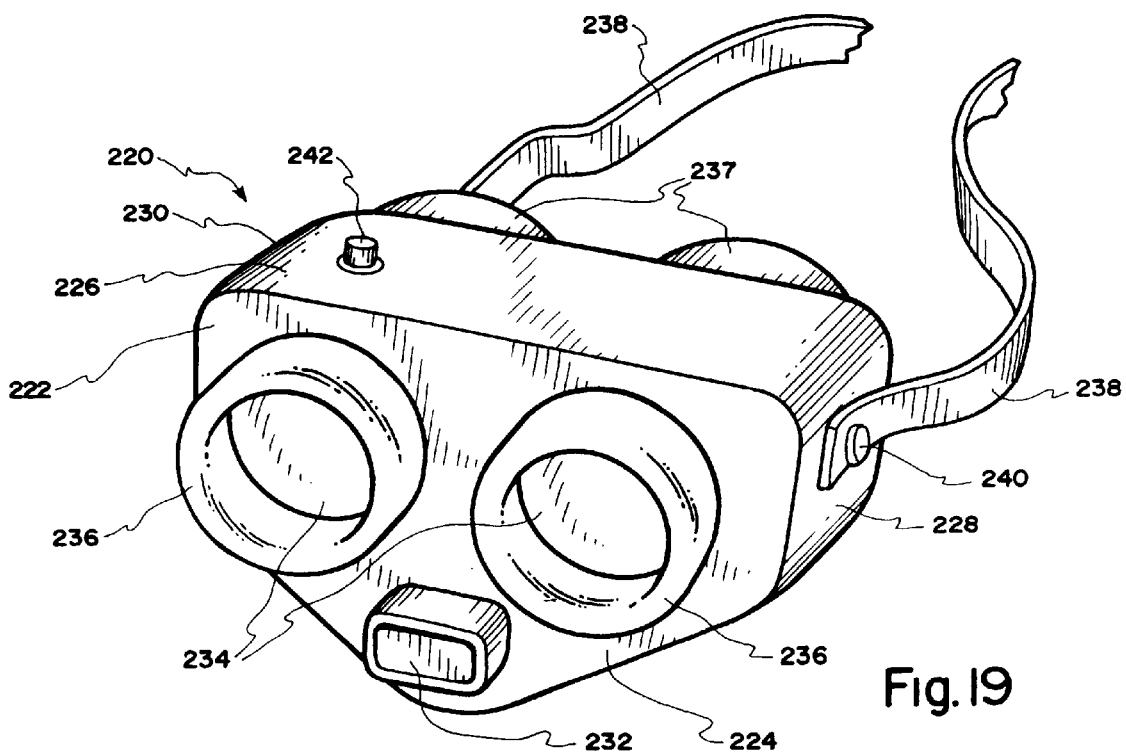
FIG. 19 is a perspective view of a hand-held rangefinder.
Figure 20:
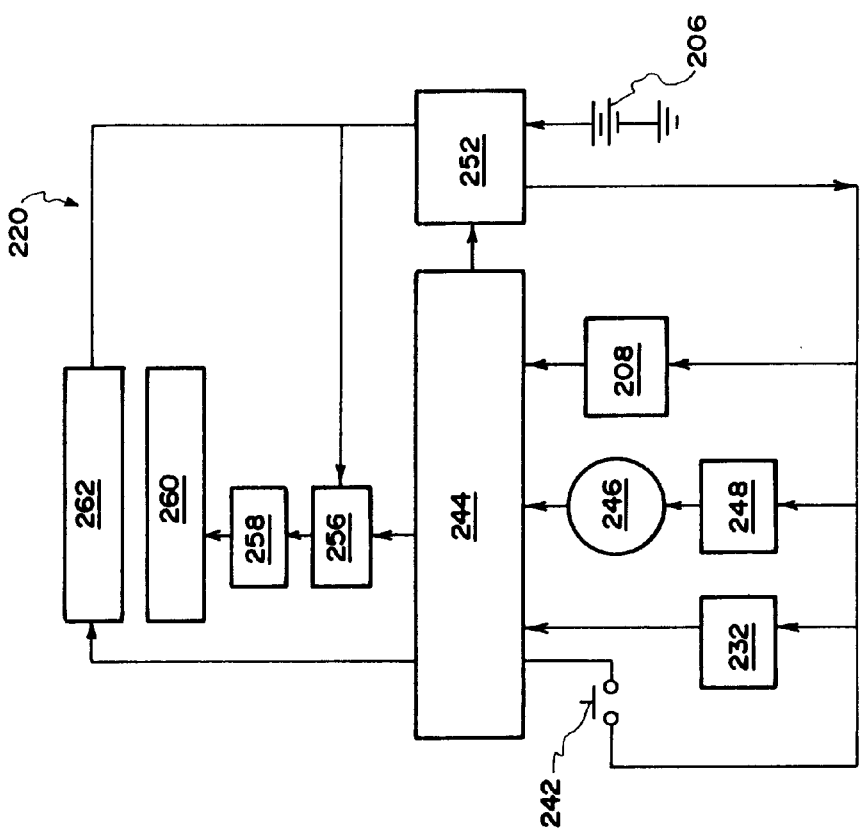
FIG. 20 is a circuit diagram illustrating the internal circuitry and components of the rangefinder shown in FIG. 19.
Figure 21:
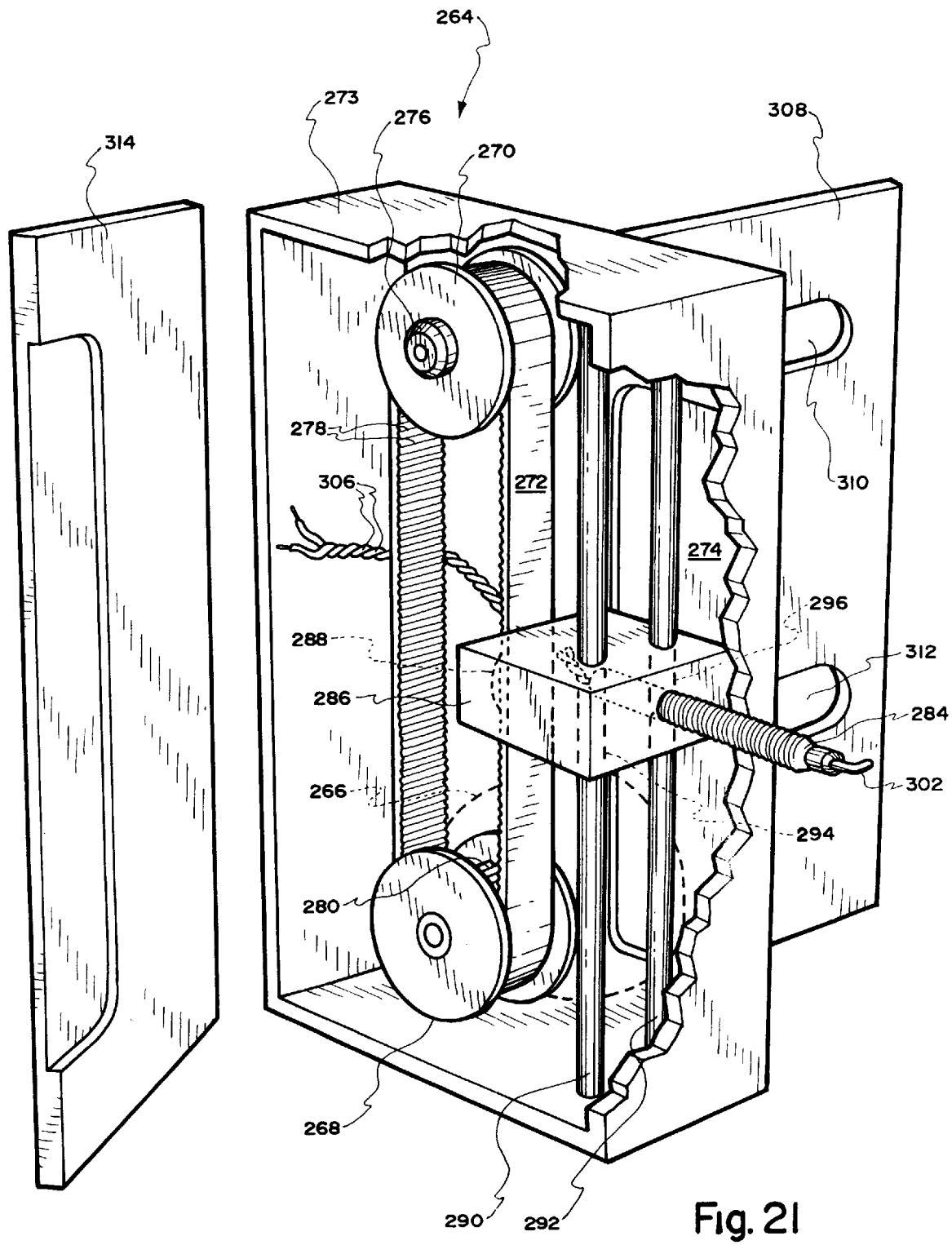
FIG. 21 is a perspective view of a belt/pulley electro-mechanical sight indicator positioning mechanism.

FIGS. 19 and 20 show yet another alternative embodiment of the present invention, namely a hand-held rangefinder 220. As shown in FIG. 19, the hand-held rangefinder 220 comprises a housing 222 which comprises a front surface 224, a top surface 226, and two side surfaces 228 and 230. As shown, a point-to-point measuring device 232 is disposed on the housing front surface 224. The point-to-point measuring device 232 may comprise a laser point-to-point measuring device. Additionally, the housing front surface further comprises two lenses 234 which permit the user to focus on a target. The lenses 234 are illustrated as having cylindrical lens protectors 236 formed around the lenses to protect them from being scratched or otherwise damaged. Eye pieces 237 are provided to permit the user to conveniently align their eyes with the lenses 234. A strap 238 is illustrated as being fastened to the housing 222 by fastener 240 to facilitate carrying the hand-held rangefinder 220. Lastly, to actuate the rangefinder 232, a switch 242 is provided on the housing top surface 226.

FIG. 20 illustrates a circuit diagram of the hand-held rangefinder 220. As illustrated, the internal circuitry and components of the hand-held rangefinder 220 is similar to that illustrated in FIG. 12 except the circuitry and components of FIG. 17 do not include an electro-mechanical positioning mechanism analogous to the electro-mechanical positioning mechanism 80 illustrated in FIG. 12. The remainder of the components of the internal circuitry illustrated in FIG. 17 are identical to those of FIG. 12. Specifically, the internal circuitry and components of the hand-held rangefinder 220 are illustrated as comprising a programmed data processor 244, a switch 242, a point-to-point measuring device 232, an angle sensitive transducer 246, a voltage regulator 248, an ambient light sensor 250, a switching circuit 252, battery 254, switching circuit 256, voltage regulator 258, backlighting device 260, and display 262. These components are identical to and are configured identically with analogous component switch 151, programmed data processor 159, angle sensitive transducer 160, voltage regulator 172, ambient light sensor 162, point-to-point measuring device 154, switching circuit 174, battery 170, switching circuit 166, voltage regulator 168, backlighting device 164, and display 152 of the rangefinding device 140 described above in connection with FIG. 12.

In operation, the hand-held rangefinder 220 is positioned in front of a user's eyes so that the user can conveniently look through the lenses 234 and focus upon a target. Then, the user actuates the point-to-point measuring device 232 by actuating switch 242. The programmed data processor 244 then reads the measured point-to-point distance measured by the device 232 and the angle measured by the angle sensitive transducer 246 and computes, using the above-described trigonometric relationships, the horizontal component of the distance to the target. Once the horizontal component of the distance to the target is calculated by the programmed data processor 244, the programmed data processor drives an internal display 262 to display to the user the horizontal component of the distance to the target. Then, the user may remove the rangefinder 220 from in front of his eyes and proceed to aim his archery bow at the target in accordance with the calculated horizontal component of distance to the target.

FIGS. 12 and 21–23 show an alternative embodiment of the present invention. Specifically, this embodiment shows a belt/pulley electro-mechanical sight indicator positioning mechanism 264. The sight indicator mechanism 264 is illustrated as generally comprising a motor 266 coupled with a driving pulley 268, a driven pulley 270, and a belt 272 with a sight indicator 284 coupled to the belt. While various motors can be effectively employed, motor 266 advantageously comprises a stepper motor with a speed-reducing gearhead.

The driving pulley 268, the driven pulley 270, and the belt 272 are mounted within an actuator housing 273 and are covered by housing cover 314. The driving pulley 268 and the driven pulley 270 are mounted on a housing rear wall 274 in an essentially vertical relationship. The belt 272 is positioned over both pulleys so that the rotation of the driving pulley 268 transfers rotational movement to the driven pulley 270. To reduce loss due to friction, the driven pulley 270 is mounted on a bearing 276 so that it is free to rotate about its axis. Hence, the rotation of the driving pulley 268 causes the belt 272 to move, providing a region of linear motion over a range approximately equal to the center-to-center distance between the pulleys 268 and 270.

While the belt 272 may be formed of a variety of materials (such as rubber or plastic), in order to minimize the elongation of the belt under stress, the belt is advantageously made of a composite material. Additionally, to reduce slipping between the belt 272 and the pulleys 268 and 270, the belt 272 may comprise a timing belt having teeth 278 which fit into driving pulley grooves 280 and driven pulley grooves 282.

A sight indicator 284 is coupled to the belt 272 via a bearing block 286. The bearing block 286 may be attached to the belt 272 by adhesion, by a fastener 288, or both. The sight indicator 284 is carried by and extends outwardly from the bearing block 286. The sight indicator 284 is configured identically as the sight indicator 116 described above in connection with FIG. 10.

To assist in guiding the bearing block 286 vertically as the belt 272 moves around the pulleys 268 and 270, vertical rods 290 and 292 are provided which pass through apertures 294 and 296 formed in the bearing block. The apertures 294 and 296 are spaced and sized in a way as to permit free movement of the block along the vertical rods 290 and 292. The vertical rods 290 and 292 are mounted substantially parallel to each other in a vertical orientation and are separated by a distance adequate to provide counter rotational torque and bearing loads for movements other than that desired along the vertical line of intended motion. While the rods 290 and 292 may be formed of a wide variety of materials, they are advantageously formed of aluminum or stainless steel. Thus, in this configuration, the sight indicator 284 moves vertically along the rods 290 and 292 in accordance with the position of the belt 272.

In operation, the motor 266 is driven by a motor controller such as the programmed data processor 159 (FIG. 12) described above. The programmed data processor 159 controls the vertical positioning of the sighting device by sending electrical pulses to the motor 266 via electrical conduits 298 and connector 300. Thus, the programmed data processor 159 computes the distance to a target and then drives the motor 266 to move the belt 272 which, in turn, properly positions the sight indicator 284.

To provide the user with a single point of light, a fiber optic cable 302 is positioned within the sighting device 284. A light emitting diode 304 (FIG. 22) is shown as being positioned within the bearing block 286 and adjacent to the fiber optic cable 302 to selectively illuminate the fiber optic cable. The light emitting diode 304 is driven by programmed data processor 159 via electrical conduits 306.

A mounting bracket 308 is illustrated as being rigidly affixed to the housing rear wall 274 to facilitate mounting the electro-mechanical positioning mechanism 264 on an archery bow. Specifically, the mounting bracket 308 is rigidly attached in substantially perpendicular relationship with the rear wall 274. To assist in securing the positioning device 264 to a conventional archery bow, apertures 310 and 312 are formed in the mounting bracket 308. To mount the electro-mechanical positioning device 264 on a conventional archery bow, fasteners are passed through apertures 310 and 312 and are connected with conventional apertures formed in the archery bow.

In operation, the sight positioning system 264 is mounted on an archery bow by passing fasteners through apertures 310 and 312 formed in the bracket 308. The motor 266 is coupled with a programmed data processor 159 (FIG. 12), via electrical conduits 298 and connector 300. A light emitting diode 304 is also electrically coupled with the programmed data processor 159 (FIG. 12), by electrical conduits 306. In this configuration, the vertical position of the sighting device 284 may be controlled by the programmed data processor by causing the motor to position the belt 272 at the desired location. Similarly, the programmed data processor causes the fiber optic cable 302 to be selectively illuminated by selectively illuminating the light emitting diode 304 by passing the appropriate signals through electrical conduits 306.

In compliance with the statute, the invention has been described in language more or less specific as to structural and methodical features. It is to be understood, however, that the invention is not limited to the specific features shown and described, since the embodiments herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A rangefinder apparatus for determining a target distance from a shooter of an implement used to cast a projectile to a target at which the projectile is directed, comprising:

a housing;

a sensor coupled to the housing, the sensor measuring an elevation angle of the housing;

a programmed data processor operatively coupled to the sensor, the data processor performing trigonometric calculations based on the measured elevation angle to calculate a distance to a target.

2. A rangefinder apparatus according to claim 1 wherein the sensor produces an elevation angle voltage, the elevation angle voltage being proportional to the elevation angle.

3. A rangefinder apparatus according to claim 1, further comprising a liquid crystal display operatively coupled with the programmed data processor to display the horizontal distance from the user to the target as calculated by the programmed data processor.

4. A rangefinder apparatus according to claim 1, further comprising:
- a liquid crystal display operatively coupled with the programmed data processor to display the horizontal distance to the target as calculated by the programmed data processor;
- a backlighting device operatively coupled to the liquid crystal display to facilitate viewing the display in low light conditions.

5. A rangefinder apparatus according to claim 1, further comprising:
- a liquid crystal display operatively coupled with the programmed data processor to display the horizontal distance to the target as calculated by the programmed data processor;
- a backlighting device operatively coupled with the display to facilitate viewing the display in low light conditions;
- an ambient light sensor operatively coupled to the programmed data processor to measure an amount of ambient light;
- the programmed data processor being programmed to monitor the amount of ambient light measured by the ambient light sensor and to selectively energize the backlighting device based on the amount of ambient light measured by the ambient light sensor.

6. A rangefinder apparatus according to claim 1, further comprising at least one input device coupled with the programmed data processor for providing input to the programmed data processor.

7. A rangefinder apparatus according to claim 1 wherein the elevation angle comprises the angle formed between a line of sight between the housing and the target and a reference axis.

8. A rangefinder apparatus according to claim 1, further comprising:
- a bow;
- a sight indicator coupled to the bow;
- the housing being secured to the bow, the sensor and the programmed data processor being disposed within the housing.

9. A rangefinder apparatus according to claim 1, further comprising:
- a power source;
- a voltage regulator electrically positioned between the power source and the sensor.

10. A rangefinder apparatus according to claim 1 wherein the programmed data processor is programmed to calibrate the apparatus for substantially level ground operation.

11. A rangefinder apparatus according to claim 1 wherein the programmed data processor is programmed to calibrate the apparatus for inclined ground operation.

12. A rangefinder apparatus according to claim 1 wherein the programmed data processor is programmed to store calibration constants to be used by the programmed data processor in determining the distance from the user to the target.

13. A rangefinder apparatus according to claim 1, further comprising:
- the sensor producing an elevation angle voltage, the elevation angle voltage being proportional to the elevation angle;
- the programmed data processor being programmed to read the elevation angle voltage;
- the programmed data processor being programmed to correlate the elevation angle voltage to an elevation angle for calculating the distance to the target.

14. A rangefinder apparatus according to claim 1, further comprising:
- the sensor producing an elevation angle voltage, the elevation angle voltage being proportional to the elevation angle;
- the programmed data processor being programmed to read the elevation angle voltage;
- the programmed data processor being programmed to correlate the elevation angle voltage to an elevation angle;
- the programmed data processor being programmed to convert the elevation angle to an inclination angle, the inclination angle being the compliment angle to the elevation angle, to calculate the distance to the target.

15. A rangefinder apparatus according to claim 1, further comprising:
- a liquid crystal display coupled to the programmed data processor to display readings corresponding to the distance to a target as calculated by the programmed data processor;
- the programmed data processor being programmed to average the display readings over a period of time to reduce fluctuation of the display readings.

16. A rangefinder apparatus according to claim 1 wherein the programmed data processor calculates a horizontal distance value, further comprising:
- a liquid crystal display coupled to the data processor;
- the programmed data processor being programmed to decode the horizontal distance value calculated by the programmed data processor;
- the programmed data processor being programmed to drive the liquid crystal display to display a decoded distance value.

17. A rangefinder according to claim 1, further comprising:
- a point-to-point distance measuring device operatively coupled with the programmed data processor to measure a point-to-point distance to the target;
- the programmed data processor being programmed to obtain the point-to-point distance measurement to the target from the point-to-point measuring device;
- the programmed data processor being programmed to calculate the horizontal distance to the target based on the elevation angle and the point-to-point distance measurement.

18. A rangefinder according to claim 1, further comprising:
- a laser point-to-point distance measuring device operatively coupled with the programmed data processor to measure a point-to-point distance to the target;
- the programmed data processor being programmed to obtain the laser point-to-point distance to the target from the point-to-point measuring device;
- the programmed data processor being programmed to calculate the horizontal distance to the target based on the elevation angle and the laser point-to-point distance;
- a display driven by the programmed data processor to display the calculated horizontal distance to the target.

19. A rangefinder according to claim 1 wherein the programmed data processor is programmed to calculate a tilt angle, the tilt angle comprising the angle formed between the line of sight between a user and the target and a release line, the release line being the line along which a projectile must be released at a given velocity in order to hit the target.

20. A rangefinder according to claim 1, wherein the rangefinder has a plurality of operating statuses and further comprises an indicator coupled to the programmed data processor to indicate a current operating status of the rangefinder.

21. A rangefinder apparatus for determining a distance from a user to a target, comprising:
   a housing;
   a sensor coupled to the housing, the sensor measuring an elevation angle of the housing;
   a programmed data processor operatively coupled to the sensor, the data processor performing trigonometric calculations based on the measured elevation angle to calculate a distance to a target;
   a bow;
   at least one sight indicator coupled to the bow, the sight indicator comprising:
      a tube;
      a fiber optic cable disposed within the tube;
      a light emitting diode coupled with the fiber optic cable to illuminate the fiber optic cable.

22. A rangefinder apparatus for determining a distance from a user to a target, comprising:
   a housing;
   a sensor coupled to the housing, the sensor measuring an elevation angle of the housing;
   a programmed data processor operatively coupled to the sensor, the data processor perfonning trigonometric calculations based on the measured elevation angle to calculate a distance to a target:
   a bow;
   at least one sight indicator coupled to the bow, the sight indicator comprising:
      a tube;
      a fiber optic cable disposed within the tube;
      a multi-color light emitting diode coupled with the fiber optic cable to illuminate the fiber optic cable;
   the programmed data processor being coupled to the light emitting diode to selectively illuminate the light emitting diode with different colors.

23. A rangefinder according to claim 1 wherein the programmed data processor is programmed to convert the calculated distance to the target into different units of measurement.

24. A rangefinder according to claim 1 wherein the programmed data processor is programmed to convert the calculated distance to the target into a unit of measure approximately equivalent to a user's individual paces.

25. A rangefinder according to claim 1 wherein the programmed data processor comprises a microprocessor.

26. A method of determining a target distance from a shooter of an implement used to cast a projectile to a target at which the projectile is directed, comprising the steps of:
   providing a rangefinder comprising a programmed data processor;
   measuring an elevation angle, the elevation angle being formed between a reference axis and a line of sight between the rangefinder and a target;
   operating the programmed data processor to calculate the distance to the target based on the measured elevation angle.

27. A method of determining a distance to target according to claim 26, further comprising the steps of:
   providing an angle sensor coupled to the programmed data processor which produces an elevation angle voltage proportional to the elevation angle;
   operating the programmed data processor to detect the elevation angle voltage and correlate the elevation angle voltage to an elevation angle for calculating the distance to the target.

28. A method of determining a distance to a target according to claim 26, further comprising the steps of:
   providing a display coupled to the programmed data processor to display the distance to the target as calculated by the programmed data processor;
   operating the programmed data processor to drive the display to display the distance to the target as calculated by the programmed data processor.

29. A method of determining a distance to a target according to claim 26, further comprising the steps of:
   providing the rangefinder with at least one input device coupled to the programmed data processor;
   providing a programned data processor comprising a plurality of pre-programmed values stored therein;
   indexing through the pre-programmed values by actuating the input device;
   storing one of the pre-programmed values as an elevation height;
   operating the programmed data processor to calculate the distance the target based on the measured elevation angle and the stored elevation height.

30. A method of determining a distance to a target according to claim 26, further comprising the steps of:
   providing at least one input device coupled to the programmed data processor;
   providing a display coupled to the programmed data processor, the display comprising a reading thereon;
   obtaining a distance from a base point to an object in the vicinity of a shooting area, the base point comprising a point on the ground directly below the user;
   orienting the rangefinder such that it is aimed at the object in the vicinity of the shooting area;
   actuating the input device to change the reading on the display until the obtained distance is displayed;
   calculating an elevation height based on the obtained distance and the elevation angle;
   storing the elevation height in the programmed data processor;
   operating the programmed data processor to calculate the distance to a target based on the measured elevation angle and the stored elevation height.

31. A method of determining a distance to a target according to claim 26, further comprising the steps of:
   providing at least one input device coupled to the programmed data processor;
   providing a display coupled to the programmed data processor, the display comprising a reading thereon;
   obtaining a distance from a base point to an object in the vicinity of a shooting area, the base point being the point on the ground directly below the user;
   orienting the rangefinder such that it is aimed near the object in the vicinity of the shooting area;
   actuating the input device to change the reading on the display until the obtained distance is displayed;

calculating an inclination angle based on the obtained distance, the inclination angle being the angle formed between a vertical axis and a line between the base point and the target;

storing the inclination angle in the programmed data processor;

operating the programmed data processor to calculate the distance to the target based on the inclination angle.

32. A method of determining a distance to a target according to claim 26, further comprising the steps of:

calculating the calculated distance on a continual basis;

providing a display coupled to the programmed data processor, the display displaying the calculated distance thereon;

averaging the calculated distances over a period of time to reduce fluctuations of the distance displayed on the display.

33. A method of determining a distance to a target according to claim 26, further comprising the steps of:

providing a display coupled to the programmed data processor;

decoding the calculated horizontal distance value;

driving the display to numerically display the decoded distance.

34. A method of determining a distance to a target according to claim 26, further comprising the steps of:

providing a sensor coupled to the programmed data processor, the sensor producing an elevation angle voltage which is proportional to the elevation angle;

monitoring the activity of the sensor;

selectively energizing the rangefinder according to the activity of the sensor.

35. A method of determining a distance to a target according to claim 26, further comprising the steps of:

providing an ambient light sensor coupled to the programmed data processor;

providing a display coupled to the programmed data processor to display the calculated distance;

providing a backlighting device coupled with the programmed data processor for making the display easier to read in low light conditions;

measuring the ambient light with the ambient light sensor;

selectively activating the backlighting device based on the ambient light measured by the ambient light sensor.

36. A method of determining a distance to a target according to claim 26, further comprising the steps of:

providing a programmed data processor comprising a plurality of operating statuses;

providing a display coupled to the programmed data processor;

driving the display to indicate the current operating status of the programmed data processor.

37. A method of determining a distance to a target according to claim 26, further comprising the steps of:

measuring a point-to-point distance to the target;

operating the programmed data processor to calculate the horizontal distance to the target based on the measured point-to-point distance and the elevation angle.

38. A method of determining a distance to a target according to claim 26, further comprising the steps of:

measuring a point-to-point distance between the user and the target;

operating the programmed data processor to calculate the horizontal distance between the user and the target based on the measured point-to-point distance and the elevation angle;

providing a display;

displaying the calculated horizontal distance on the display.

39. A method of determining a distance to a target according to claim 26, further comprising the step of operating the programmed data processor to calculate a tilt angle, the tilt angle comprising the angle formed between a line of sight to the target and a release line, the release line being the line along which a projectile must be released at a velocity in order to hit a target at a distance.

40. A method of determining a distance to a target, comprising the steps of:

providing a rangefinder comprising a programmed data processor;

measuring an elevation angle, the elevation angle being formed between a reference axis and a line of sight between the rangefinder and a target;

operating the programmed data processor to calculate the distance to the target based on the measured elevation angle;

providing a bow;

providing a programmed data processor which has a plurality of operating statuses;

providing a sight indicator coupled with the bow;

selectively illuminating the sight indicator with different colors to indicate the operating status of the programmed data processor.

41. A rangefinder apparatus for determining a horizontal distance from a user to a target, comprising:

a bow;

a housing coupled with the bow;

a sensor disposed within the housing which measures an elevation angle, the elevation angle being formed between a reference axis and a line of sight made between the sensor and a target;

a laser point-to-point distance measuring device coupled with the housing to measure a point-to-point distance to the target;

a microprocessor operatively coupled with the sensor and operatively coupled with the point-to-point measuring device and programmed to calculate the horizontal distance between to the target based on the measured elevation angle and the measured point-to-point distance.

42. A rangefinder according to claim 41, further comprising:

a liquid crystal display operatively coupled with the microprocessor to display the horizontal distance to the target as calculated by the microprocessor;

an ambient light sensor coupled with the microprocessor to measure an amount of ambient light;

a backlighting device operatively coupled with the microprocessor to facilitate viewing the display in low light conditions;

the microprocessor being programmed to monitor the amount of light measured by the ambient light sensor and to selectively activate the backlighting device based on the amount of ambient light measured by the ambient light sensor.

43. A rangefinder according to claim 41 wherein the microprocessor has a plurality of operating statuses, further comprising:

at least one sight indicator coupled to the bow, the sight indicator comprising:
a tube;
a fiber optic cable disposed within the tube;
a multi-color light emitting diode coupled with the fiber optic cable to selectively illuminate the fiber optic cable;
the microprocessor being programmed to selectively illuminate the light emitting diode with different colors depending on the current operating status of the microprocessor.

44. A method of determining a horizontal distance from a shooter of an implement used to cast a projectile to a target at which the projectile is directed, comprising the steps of:
providing a rangefinder comprising a programmed data processor;
measuring an elevation angle, the elevation angle being formed between a reference axis and a line of sight between a user and a target;
measuring a point-to-point distance between the user and the target;
operating the programmed data processor to calculate the horizontal distance between the user and the target based on the measured point-to-point distance and the measured elevation angle.

45. A method of determining a horizontal distance to a target, comprising the steps of:
providing a rangefinder comprising a programmed data processor;
measuring an elevation angle, the elevation angle being formed between a reference axis and a line of sight between a user and a target;
measuring a point-to-point distance between the user and the target;
operating the programmed data processor to calculate the horizontal distance between the user and the target based on the measured point-to-point distance and the measured elevation angle;
continually determining the calculated distance;
providing the rangefinder with a display operatively coupled with the programmed data processor, the display being capable of displaying the calculated distance thereon;
operating the programmed data processor to average the calculated distances over a period of time to reduce fluctuations of the distance displayed on the rangefinder display;
providing an angle sensor operatively coupled with the programmed data processor which measures the elevation angle;
monitoring the activity of the angle sensor;
selectively energizing the rangefinder based on the activity of the angle sensor;
providing an ambient light sensor operatively coupled with the programmed data processor;
providing a backlighting device operatively coupled with the programmed data processor to make the display easier for the user to read in low light conditions;
measuring an amount of ambient light with the ambient light sensor;
monitoring the amount of ambient light measured by the ambient light sensor;
selectively activating the backlighting device based on the ambient light measured by the ambient light sensor.

46. A method of determining a horizontal distance to a target, comprising the steps of:
providing a rangefinder comprising a programmed data processor;
measuring an elevation angle, the elevation angle being formed between a reference axis and a line of sight between a user and a target;
measuring a point-to-point distance between the user and the target;
operating the programmed data processor to calculate the horizontal distance between the user and the target based on the measured point-to-point distance and the measured elevation angle;
providing a bow;
providing a sight indicator coupled with the bow;
selectively illuminating the sight indicator with different colors to indicate the operating status of the rangefinder.

47. A rangefinder apparatus for determining a distance from a user to a target comprising:
a bow;
a housing attached to the bow;
a sensor coupled to the housing, the sensor measuring an elevation angle of the housing;
a programmed data processor operatively coupled to the sensor, the data processor performing trigonometric calculations based on the measured elevation angle to calculate a distance to a target;
at least one sight indicator coupled to the bow, the sight indicator comprising:
a tube;
a fiber optic cable disposed within the tube;
a light emitting diode coupled with the fiber optic cable to illuminate the fiber optic cable.

48. A rangefinder according to claim 47 wherein said programmed data processor is coupled to the light emitting diode to selectively illuminate the light emitting diode with different colors.

49. A method of determining a distance to a target, comprising:
providing a rangefinder comprising a programmed data processor which has a plurality of operating statuses;
measuring an elevation angle, the elevation angle being formed between a reference axis and a line of sight between the rangefinder and a target;
operating the programmed data processor to calculate the distance to the target based on the measured elevation angle;
providing a bow;
providing a sight indicator coupled with the bow;
identifying the sight indicator to indicate the operating status of the programmed data processor.

50. A method of determining a horizontal distance to a target, comprising:
providing a rangefinder comprising a programmed data processor;
measuring an elevation angle, the elevation angle being formed between a reference axis and a line of sight between a user and a target;
measuring a point-to-point distance between the user and the target;
operating the programmed data processor to calculate the horizontal distance between the user and the target based on the measured point-to-point distance and the measured elevation angle;

continually determining the calculated distance;

providing the rangefinder with a display operatively coupled with the programmed data processor, the display being capable of displaying the calculated distance thereon;

operating the programmed data processor to average the calculated distances over a period of time to reduce fluctuations of the distance displayed on the rangefinder display;

providing an angle sensor operatively coupled with the programmed data processor which measures the elevation angle;

monitoring the activity of the angle sensor;

selectively energizing the rangefinder based on the activity of the angle sensor;

providing an ambient light sensor operatively coupled with the programmed data processor;

providing a backlighting device operatively coupled with the programmed data processor to enable reading of the display in low light conditions;

measuring an amount of ambient light with the ambient light sensor;

monitoring the amount of ambient light measured by the ambient light sensor;

activating the backlighting device based on the ambient light measured by the ambient light sensor.

51. A method of determining a horizontal distance to a target, comprising:

providing a rangefinder comprising a programmed data processor;

measuring an elevation angle, the elevation angle being formed between a reference axis and a line of sight between a user and a target;

measuring a point-to-point distance between the user and the target;

operating the programmed data processor to calculate the horizontal distance between the user and the target based on the measured point-to-point distance and the measured elevation angle;

providing a bow;

providing a sight indicator coupled with the bow;

identifying the sight indicator to indicate the operating status of the rangefinder.

* * * * *